(12) United States Patent
Allen

(10) Patent No.: US 6,883,438 B2
(45) Date of Patent: Apr. 26, 2005

(54) MOUNTING ASSEMBLY

(76) Inventor: Garry William Allen, 3 Donilla Place, Nerang (AU), QLD 4211

( * ) Notice: Subject to any disclaimer, the term of this patent is extended or adjusted under 35 U.S.C. 154(b) by 228 days.

(21) Appl. No.: 10/146,981

(22) Filed: May 16, 2002

(65) Prior Publication Data

US 2002/0195911 A1 Dec. 26, 2002

Related U.S. Application Data

(63) Continuation-in-part of application No. 09/011,294, filed on Oct. 20, 1998, now Pat. No. 6,484,645.

(30) Foreign Application Priority Data

May 16, 2001 (AU) .............................................. PR5017

(51) Int. Cl.[7] .................................................. A47B 3/00
(52) U.S. Cl. ........................................ 108/133; 108/38
(58) Field of Search ............................. 108/33, 38, 42, 108/34, 39, 40; 312/313, 316, 311; 248/235, 240.1, 250, 241, 242, 225.51; 38/137, 103, 104, 138, 139

(56) References Cited

U.S. PATENT DOCUMENTS

| | | | |
|---|---|---|---|
| 160,475 A | * 3/1875 | Shannon | 248/242 |
| 2,473,022 A | * 6/1949 | Fenke, Jr. | 108/38 |
| 2,567,538 A | * 9/1951 | Anderson | 108/40 |
| 2,680,314 A | * 6/1954 | Snyder | 108/39 |
| 3,300,791 A | 1/1967 | Carmack | |
| 4,480,556 A | * 11/1984 | Wilson et al. | 108/48 |
| 4,686,355 A | * 8/1987 | Lay | 108/33 |
| 4,836,478 A | 6/1989 | Sweere | |
| 4,961,388 A | 10/1990 | Simpson | |
| 5,255,724 A | 10/1993 | Butke | |
| 5,369,898 A | 12/1994 | Sorenson | |
| 5,452,531 A | * 9/1995 | Graville et al. | 38/104 |
| 5,479,865 A | * 1/1996 | Cauffiel | 108/42 |
| 5,622,119 A | 4/1997 | Hsieh | |
| 5,709,155 A | * 1/1998 | Terracciano | 108/42 |
| 6,484,645 B1 | * 11/2002 | Allen | 108/33 |

FOREIGN PATENT DOCUMENTS

| | | | |
|---|---|---|---|
| AU | 18523/88 | 1/1989 | |
| AU | 199863723 | 11/1998 | |
| EP | 278 796 | 8/1988 | |
| GB | 853043 | 11/1960 | |
| GB | 2107177 | * 4/1983 | 248/242 |
| GB | 2271360 | 4/1994 | |
| WO | 83/00990 | 3/1983 | |
| WO | WO 97/04159 | 2/1997 | |

* cited by examiner

Primary Examiner—Jose V. Chen
(74) Attorney, Agent, or Firm—Merchant & Gould P.C.

(57) ABSTRACT

A mounting assembly for a member, in one embodiment an ironing board, allows the member to be moved angularly from a storage position to a working position. First and second links are each pivotally mounted to a support at respective first ends of each link, and each pivotally mounted to the member at respective second ends of each link. The links each include an abutment portion and are arranged so that when the member is moved into the working position the abutment portions of the first and second links engage to prevent movement of the member past the working position. At the working position of the member, the second end of the first link and the second end of the second link are both intermediate the first end of the fast link and the first end of the second link.

13 Claims, 20 Drawing Sheets

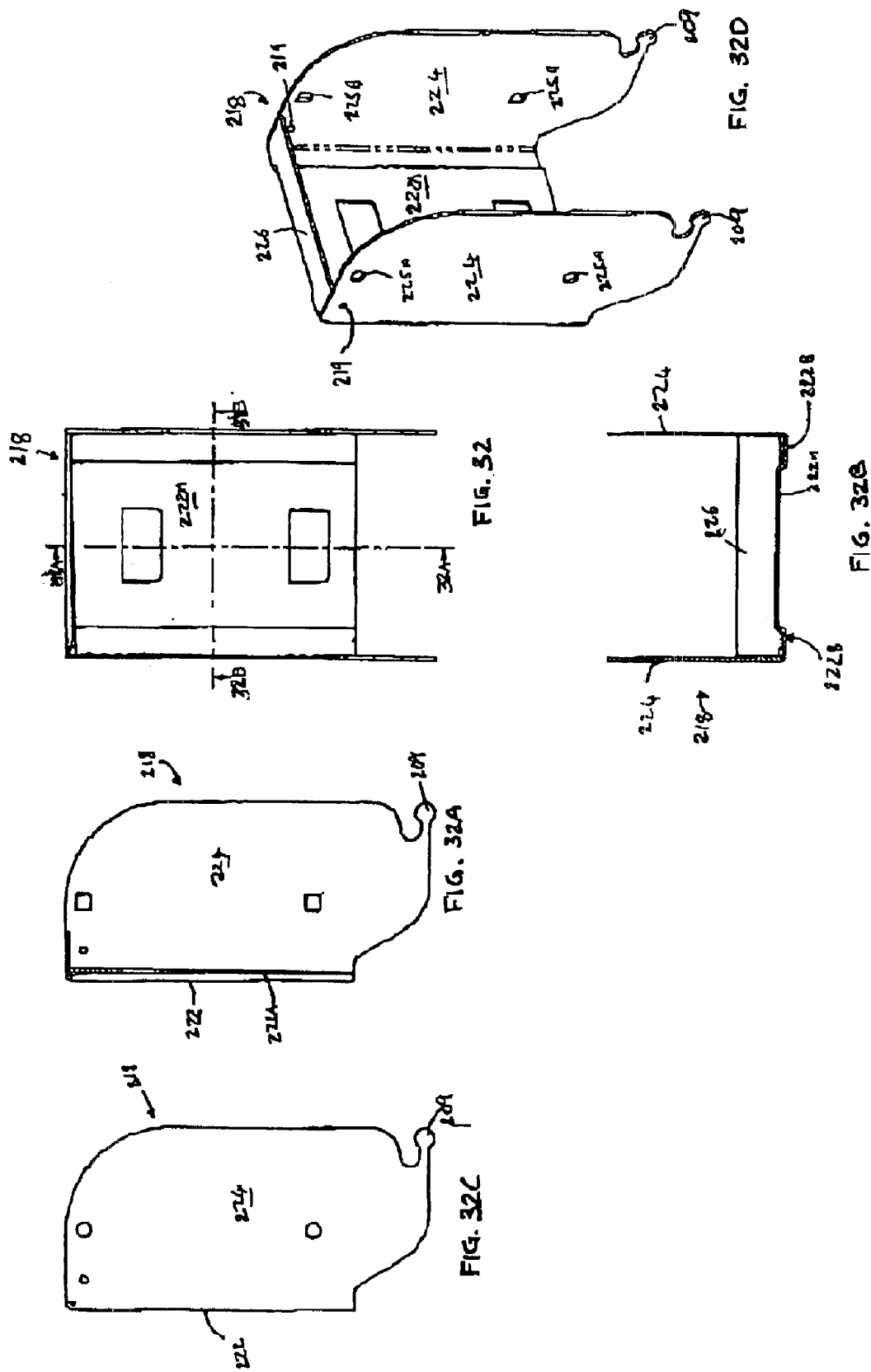

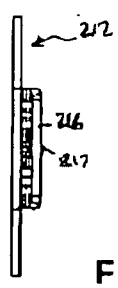
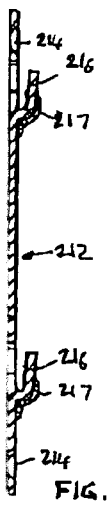
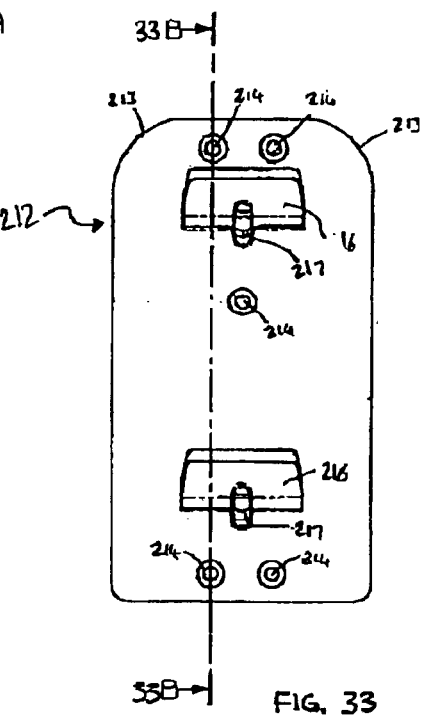
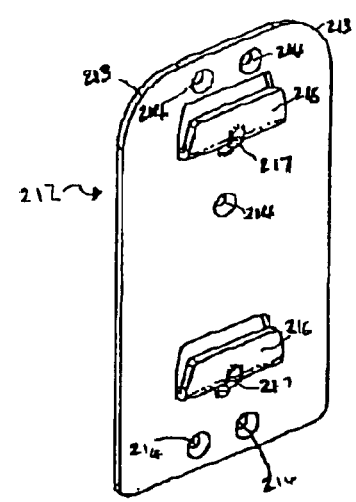
FIG. 33A
FIG. 33B
FIG. 33
FIG. 33C

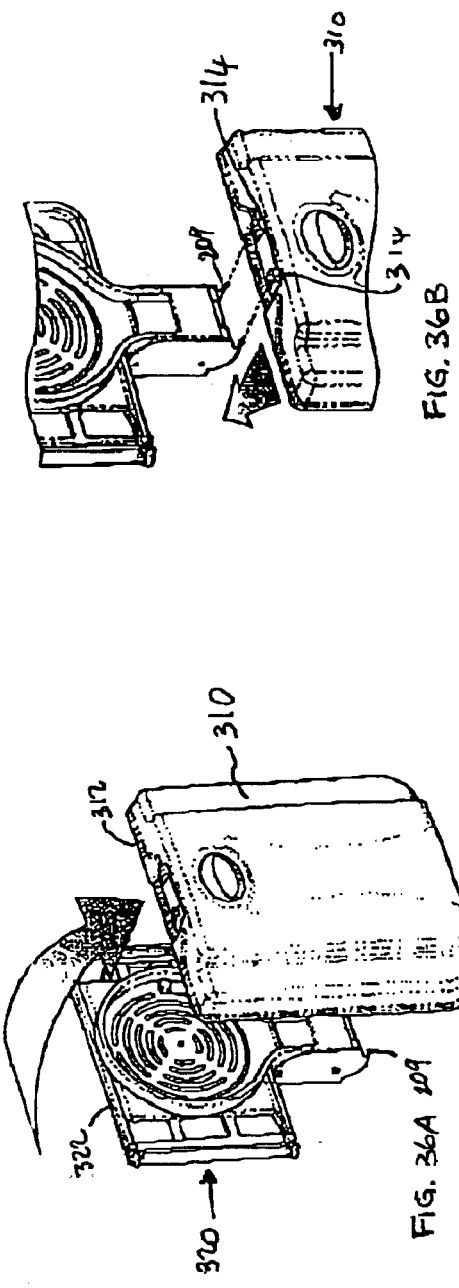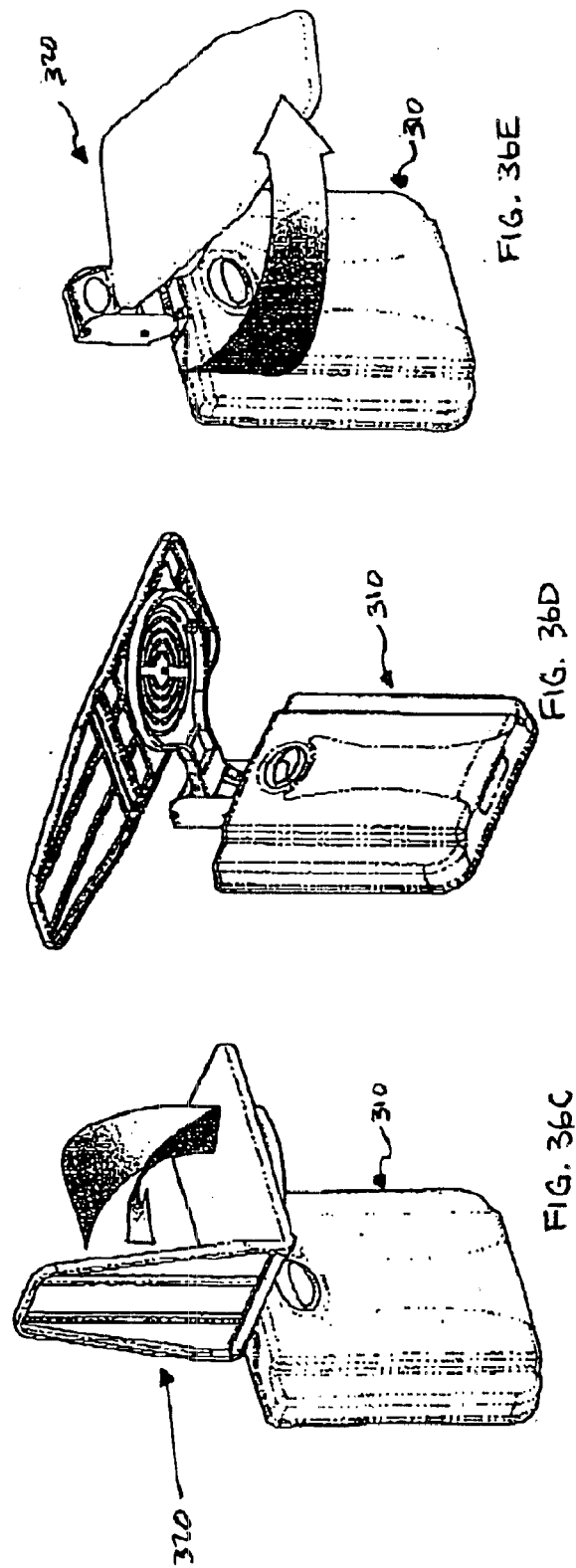

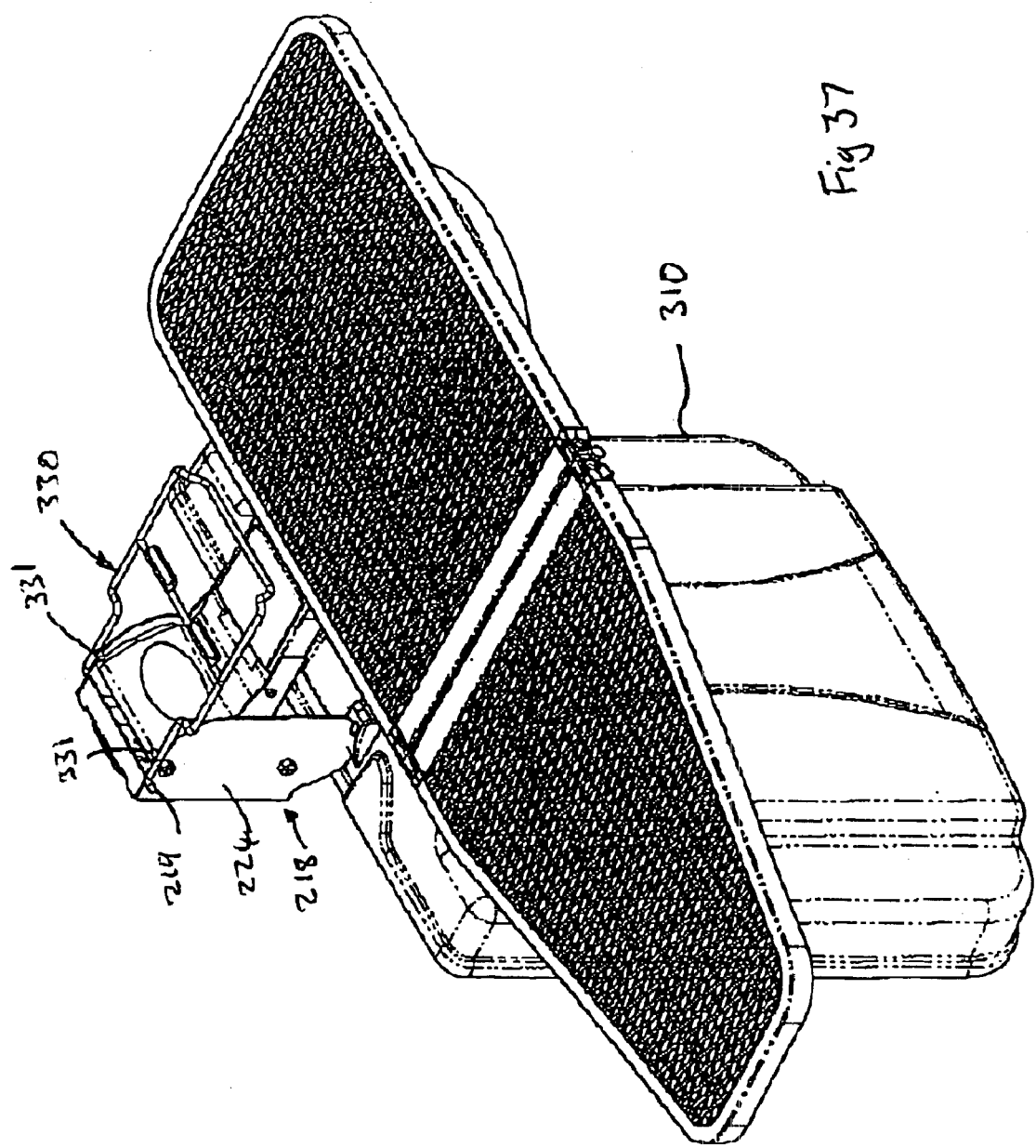

MOUNTING ASSEMBLY

This is a CIP of Ser. No. 09/011,294 filed Oct. 20, 1998 now U.S. Pat. No. 6,484,645.

FIELD OF THE INVENTION

This invention relates to a hinge mechanism applicable to angularly movable wings such as a foldaway ironing board assembly and to assemblies employing the hinge mechanism such as a foldaway ironing board assembly mounted to a support structure such as a wall, kitchen unit, cupboard bench support, mobile cabinet or drawer.

BACKGROUND ART

Many different mechanisms are employed in establishing items such as foldaway ironing board assemblies which save space and offer advantages over more conventional portable ironing boards which are supported from the ground by scissor action legs. These conventional portable ironing boards are not always easy to erect and stow and they are therefore considered inconvenient. In contrast foldaway ironing board assemblies mounted to a support structure are usually more convenient than portable ironing boards. They can be easier to move from a stored position to an operative position depending on the nature of the mechanism by which they are mounted.

When in a stored position the above foldaway ironing board assemblies are located against, for example, a wall in which the longitudinal axis of the board is positioned vertically. When moved between the stored and an operative position the longitudinal axis pivots about a vertical axis and therefore the length of the ironing board protrudes out into a room. This therefore limits the type of room such foldaway ironing boards can be practically used in. Furthermore, the protruding tapered end of the ironing board is substantially unsupported and excessive pressure on this end may damage supporting struts extending from the wall to the underside of the ironing board.

U.S. Pat. No. 5,369,898 (Sorensen) is a wall mounted board, pivoted down from a vertical storage position to a working disposition whereat the board rests on a bracket acting against further downward angular movement.

GB 2271360 (Burke) is a similar board to that of Sorensen above, mounted inside a cabinet with a height adjustment. These styles are hinged at their end and extend outwardly perpendicularly from the wall behind them.

U.S. Pat. No. 4,961,388 (Simpson) provides its board on a mechanism which pivots and rotates out of its storage position.

U.S. Pat. No. 4,480,556 (Wilson et al) provides its board with a mechanism for swivelling the board between two horizontal positions at different heights on a turntable mounting locked by a ratchet.

OBJECT OF THE INVENTION

It is an object of the present invention to provide a mechanism for pivoting a member which mechanism shifts the centre of angular movement of the member off the support to the member enabling more compact structures.

It is a further object of the invention to enable the pivoting of wings out of storage compartments which are more compact than has hitherto for been possible.

It is a still further object of the invention to provide an ironing board able to be folded out of a compact storage space into a working disposition.

DISCLOSURE OF THE INVENTION

According to a first aspect of the present invention, there is provided a mounting assembly for a member by which the member is angularly movable from a storage position to a working position, comprising:

a first link adapted for pivotal mounting to a support at a first end of said first link at a connection point thereof, and for pivotal mounting to said member at a second end of said first link; and a second link adapted for pivotal mounting to the support at a first end of the second link, at a point on the support below the connection point of the first link, said second link being adapted for pivotal mounting to said member at a second end of the second link; wherein:

said second link is abutted, in use, at the working position of the member, against a stop means or limit means on said first link to prevent angular movement of the member past the working position; and in use, at the working position of the member, the second end of the first link and the second end of the second link are both intermediate the first end of the first link and the first end of the second link.

Preferably, said first link is pivoted together with a plate at its second end, said plate having an arcuate slot therein concentric with the pivot at the second end of the first link, the second link being pivotally connected at its second end with said plate at a point adjoining the end of said slot, said member being fitted with pin captured in said slot.

According to a second aspect of the present invention, there is provided a wing with an edge about which it pivots, said wing being mounted at respective ends of said edge by a pair of mounting assemblies in accordance with the first aspect of the present invention.

Preferably, the support to the pair of mountings is mounted on sliding tracks for translation from the working position prior to rotation into the working position.

Preferably, the wing supports thereon a rotatably mounted planar element.

Preferably, the planar element is in two segments one hinged to the other for movement from a folded position to a co-planar disposition.

According to a third aspect of the present invention, there is provided an ironing board comprising:

a planar element adapted to provide an ironing surface;

mounting means by which the planar element is able to be moved from a storage position to a working position;

said mounting means comprising a pair of spaced apart pivotal linkages, each said pair having first and second links connected at respective spaced apart first ends to a support and respective spaced apart second ends to the planar element wherein:

said second link engages a stop means or limit means located on the first link restricting angular movement of the ironing surface past the working position; and in use, at the working position of the ironing surface, the second end of the first link and the second end of the second link are both intermediate the first end of the first link and the first end of the second link.

Preferably, the stop or limit means is mounted to the first link and engages at the working position with that end of the second link which attaches to the ironing surface, said engagement involving a convex surface nested in a complementary concavity on the respective engaging parts.

Preferably the storage position is vertically in a wall mounted cabinet, the first and second links extend from the back of the cabinet standing the planar element thereof, the first or second links enabling angular movement to a generally horizontal working disposition projected forwardly of the cabinet.

The storage position may be in a cabinet where the support is a frame on tracks, able to be drawn from within the cabinet to a position whereat the board can be moved angularly to the working position.

Preferably, the ironing surface is stored off the links on support arms permitting the ironing surface to be moved over the frame to a generally vertical storage position at the rear thereof.

The storage position may be in a drawer unit, in this case the planar element is mounted to the floor thereof via said first and second links and an intermediate pivotal plate pivotally connected with the second end of the first link at the planar element with an arcuate slot therein concentric therewith, said plate being pivotally connected with the second end of the second link and said planar element having a pin thereon engaged in said slot whereby to enable the planar element to lie in a storage position in said drawer unit and be drawn upwardly therefrom to a working position extending outwardly of the drawer unit.

Preferably, the planar element is fitted with a turntable on which is disposed to a two part hinged together board adapted to form the ironing surface being foldable to collapse into said drawer unit when being stored.

According to a fourth aspect of the present invention there is provided a mounting assembly for angularly moving an apparatus between a first position and a second position and for supporting the apparatus in the second position, the mounting assembly including:

a support member securable to a single stud of a cavity wall and arranged, in use, to support the mounting assembly and apparatus when so secured;

a first link member having a pair of link arms and a body portion therebetween, first ends of the link arms being pivotally mounted to the support member and second ends of the link arms being pivotally mounted to the apparatus distal to an end of the apparatus; and a second link member having a pair of link arms and a body portion therebetween, first ends of the link arms being pivotally mounted to the support member and second ends of the link arms being pivotally mounted to the apparatus proximal to said end of the apparatus; wherein, in use, interaction between the first and second link members restricts angular movement of the apparatus beyond the second position and supports the apparatus in the second position.

The support member is securable to a single stud of a cavity wall but need not be so secured. That is to say that the support member can be secured, in use, to any suitable support element, such as a masonry wall, but must be capable of being secured to a single stud and support the mounting assembly and the apparatus when secured to a single stud. The support member may be secured directly to the support element by any suitable means including fasteners such as screws. Preferably, however, the support member is indirectly secured to the support element through a mounting plate which is arranged to be directly secured to the support element. Preferably, the support member is releasably securable to the mounting plate. Preferably the support member and mounting plate are securable by interaction of a plurality of slots on one of the support member and the mounting plate with a plurality of lugs on the other of the support member and the mounting plate. More preferably, the support member is formed with a plurality of slots arranged to receive a corresponding plurality of lugs which project upwardly and outwardly from a face of the mounting plate at an acute angle. In use, the slots are aligned with the lugs as the support member approaches the mounting plate (secured to a support element) and pass over the lugs so that the support member is held against the face of the mounting plate by the lugs. The support member can be unsecured from the mounting plate by reversing this procedure. The mounting plate can preferably be formed from a sheet of metal by sheet metal working operations including cutting, stamping, punching and folding.

Preferably, at least one of the first and second link members is made from a plastic material.

Preferably, the plastic material is glass reinforced nylon.

Preferably, said link member is injection moulded.

The support member preferably has a body portion which, in use, abuts the support element or the face of the mounting plate and a pair of substantially vertically extending limbs which project substantially normally from sides of the body portion. Where the support member is configured for use with the mounting plate, the plurality of slots or lugs may be formed in the body portion of the support member. The support member is securable to a single stud of a cavity wall and preferably, the body portion of the support member has a width (ie. between its limbs) a little larger than the width of a stud of a cavity wall. Cavity wall studs typically have a width in the order of 50–75 mm and the width of the body portion of the support member is preferably in the order of 80–150 mm, more preferably in the order of 100–130 mm. Preferably, the limbs of the support member have lower portions which project below the body portion. Upper portions of the limbs preferably project away from the top of the body portion and are spanned by a head portion which also is connected to the top of the body portion. The head portion preferably projects substantially normally from the top of the body portion. The limbs of the support member are preferably formed with upper and lower pairs of aligned apertures sized to receive pivot pins for pivotally mounting the first and second link members to the support member. Preferably, each of the first and second link members is, in use, retained at least partially between the limbs of the support member. The support member can preferably be formed from a sheet of metal by sheet metal working operations including cutting, stamping, punching and folding.

Preferably the first link member has a lateral width, parallel to an axis about which it is adapted to pivot in use, which is of the same order of magnitude as its other dimensions. Preferably the second link member has a lateral width, parallel to an axis about which it is adapted to pivot in use, which is of the same order of magnitude as its other dimensions. Preferably, said lateral width of at least one of said link members is at least one quarter as great as said other dimensions. Preferably, said lateral width is approximately the same as said other dimensions.

Preferably the body portion of at least one of the link members extends between the link arms along a significant proportion of the length of said link member. Preferably the body portion of at least one of the link members extends along most of the length of said link member. Preferably the body portion of at least one of the link members extends along substantially all of the length of said link member.

In a fifth aspect, the present invention provides a support member for a mounting assembly according to the fourth aspect of the present invention.

In a sixth aspect, the present invention provides a mounting plate securable to a single stud of a cavity wall and arranged to releasably secure a support member according to the fifth aspect of the present invention.

The first link member has a pair of link arms and a body portion therebetween which considerably enhances the strength of the first link member as compared to separate link arms and ensures that the pair of link arms operate in unison. Viewed from the side, the first link member is preferably of a generally open L shape. Preferably, the first link member takes a form which approximates the back support and seat of a chair with an obtuse angle between the back support and chair portions. Preferably, the first and second ends of the link arms correspond to the top of the back support like portion and the front of the chair seat like portion of the first link member respectively and extend towards one another meeting generally where the back support like portion meets the seat like portion in a central region of the first link member. Preferably, the first link member is of a width between the outer extremities of the pair of link arms to just be received between limbs of the support member.

Each of the first ends of the link arms of the first link member may be formed with a pivot pin arranged to be received in the support member to facilitate pivotal mounting therebetween. However, preferably, the first ends of each of the link arms of the first link member are formed with aligned apertures arranged to be aligned with upper aligned apertures provided on limbs of the support member with a pivot pin passing through the aligned apertures in the limbs and the aligned apertures in the link arms to pivotally mount the first link member to the support member. Preferably, the body portion of the first link member extends sufficiently between the pair of link arms that it too is formed with a bore which aligns with the aligned apertures in the first ends of the link arms whereby a pivot pin can be passed through the aligned apertures in the limbs of the support member, the aligned apertures in the first ends of the link arms of the first link member and the bore formed in the body portion of the first link member with the apertures in the first ends of the link arms and the bore in the body portion forming a continuous bore.

Each of the second ends of the link arms of the first link member may be formed with a pivot pin arranged to be received in the end of the apparatus to facilitate pivotal mounting therebetween. However, preferably, the second ends of each link arm are formed with aligned apertures arranged to be aligned with aligned apertures in the apparatus to pivotally mount the first link member to the apparatus. (In this context, reference to the apparatus includes an intermediate member or a frame for an apparatus.) Preferably, the body portion of the first link member extends sufficiently between the pair of link arms that it too is formed with a bore which aligns with the aligned apertures in the second ends of the link arms whereby a pivot pin can be passed to the apertures in the apparatus, the aligned apertures in the second ends of the link arms of the first link member and the bore formed in the body portion of the first link member with the apertures in the second ends of the link arms and the bore in the body portion forming a continuous bore.

The second link member has a pair of link arms and a body portion therebetween which considerably enhances the strength of the second link member as compared to separate link arms and ensures that the pair of link arms operate in unison. Viewed from the side, the second link member is preferably of a form which approximates two spaced apart pullies carrying a belt between them with one of the pullies being of larger diameter than the other. Preferably, the second link member is of a width between the outer extremities of the pair of link arms to just be received between limbs of the support member.

Each of the first ends of the link arms of the second link member may be formed with a pivot pin arranged to be received in the support member to facilitate pivotal mounting therebetween. However, preferably, the first ends of each link arm are formed with aligned apertures arranged to be aligned with the preferred lower aligned apertures of the preferred limbs of the support member referred to above with a pivot pin passing through the aligned apertures in the limbs and the aligned apertures in the link arms to pivotally mount the second link member to the support member. Preferably, the body portion of the second link member extends sufficiently between the pair of link arms that it too is formed with a bore which aligns with the aligned apertures in the first ends of the link arms whereby a pivot pin can be passed through the aligned apertures in the limbs of the support member, the aligned apertures in the first ends of the link arms of the second link member and the bore formed in the body portion of the second link member. Preferably, the apertures in the first ends of the link arms and the bore in the body portion form a continuous bore. Preferably, the end of the second link member at which the first ends of the link arms are located is of a shape which approximates the larger of the two pullies referred to above and the end of the second link member at which the second ends of the link arms are located is of a shape which approximates the smaller of the two pullies referred to above.

In use, interaction between the first and second link members restricts angular movement of the apparatus beyond the second position and supports the apparatus in the second position. Preferably, the interaction results from engagement of the first and second link members. Preferably an end portion of one of the first and second link members engages an engagement portion on the other of the first and second link members. Preferably, a convex portion of one of the first and second link members is releasably received within a corresponding concave portion of the other of the first and second link members with this engagement arrangement functioning as a stop which both prevents movement beyond the second position and supports the apparatus in the second position. More preferably, a convex portion of the second link member is releasably received within a corresponding concave portion of the first link member with this mating arrangement functioning as a stop which both prevents movement beyond the second position and supports the apparatus in the second position. The concave portion of the first link member is preferably formed in the central regions of the link arms of the first link member. The convex portion of the second link member is preferably formed at the second ends of the link arms of the second link member.

Preferably, at least one of the link members has an apparatus engagement portion for engaging a link member engagement portion of the apparatus (or an intermediate portion or frame portion) to help stabilise the apparatus when the apparatus is in the second position and said apparatus engagement portion does not engage the link member engaging portion when the apparatus is in the first position.

Preferably, the apparatus engagement portion comprises a portion provided on each link arm of the link member.

Preferably, the engagement of the apparatus engagement portion and the link member engagement portion comprises entry of a laterally elongate male portion into a laterally elongate female portion.

Preferably, the apparatus engagement portion comprises at least one groove in the second link member adapted to receive an edge of the intermediate member.

The second ends of the link arms of the first and second link members are pivotally mounted to an end of the apparatus. The first and second link members may be pivotally mounted directly to the apparatus. Preferably, however, the first and second link members are indirectly mounted to the apparatus through pivotal mounting of the first and second link members to a pivoting end of an intermediate member. Preferably, the apparatus is secured, in use, to an attachment portion of the intermediate member.

The second ends of the first and second link members may be formed with pivot pins arranged to be received in the intermediate member to facilitate pivotal mounting therebetween. However, preferably, the second ends of each link arm of the first and second link members are formed with aligned apertures arranged to be aligned with apertures in the pivoting end of the intermediate member with pivot pins passing through the apertures to pivotally mount the first and second link members to the support member. Preferably, the body portions of the first and second link members extend sufficiently between the respective pair of link arms that the body portions of the first and second link members are also formed with bores which align with the aligned apertures in the second ends of the link arms of the first and second link members whereby pivot pins can be passed through the apertures in the intermediate member, the aligned apertures in the second ends of the link arms of the first and second link members and the bores formed in the body portions of the first and second link members. Preferably, the apertures in the second ends of the link arms of the first and second link members and the bores in the corresponding body portions forming a continuous bore in the first link member and a continuous bore in the second link member.

In a seventh aspect, the present invention provides a first link member for a mounting assembly according to the fourth aspect of the present invention. Preferably, said link member has a lateral width, parallel to an axis about which it is adapted to pivot in use, which is of the same order of magnitude as its other dimensions (meaning that there is less than a factor of ten difference). Preferably, said lateral width is at least one quarter as great as said other dimensions. Preferably, said lateral width is approximately the same as said other dimensions.

In a eighth aspect, the present invention provides a second link member for a mounting assembly according to the fourth aspect of the present invention. Preferably, said link member has a lateral width, parallel to an axis about which it is adapted to pivot in use, which is of the same order of magnitude as its other dimensions. Preferably, said lateral width is at least one quarter as great as said other dimensions. Preferably, said lateral width is approximately the same as said other dimensions.

The intermediate member preferably has a pivoting end to which at least one of the first and second link members are pivotally mounted, and an attachment portion to which equipment, and or a frame for supporting equipment may be fixedly attached. The pivoting end of the intermediate member preferably takes the form of a generally rectangular shaped base portion having a pair of upstanding walls extending normally from opposed sides of the rectangular base portion. Preferably, the upstanding walls are separated by a distance arranged to receive the first or second link member therebetween and are formed with two pairs of aligned apertures. One pair of the aligned apertures is preferably located in the upstanding walls proximate the pivoting end of the intermediate member and is arranged to align with the continuous bore in the second end of the second link member with a pivot pin passing through the walls and the second end of the second link member to pivotally mount the second link member to the intermediate member. The second pair of apertures in the upstanding walls is preferably located distally of the pivoting end of the intermediate member and is arranged to align with the continuous bore in the second end of the first link member with a pivot pin passing through the walls and the second end of the first link member to pivotally mount the first link member to the intermediate member.

The attachment portion of the intermediate member preferably includes a part with the form of a generally rectangular shaped top portion having a downwardly extending wall which extends substantially normally from the side of the top portion remote from the pivoting end of the intermediate member. Preferably, the downwardly extending wall is somewhat narrower than the side of the top portion from which it extends leaving a small portion at either end of that side of the top portion from which there is no downwardly extending wall. The side of the top portion opposite the side from which the downwardly extending wall extends preferably sits between the upstanding walls of the pivoting end and is connected to the base portion of the pivoting end through a web which extends therebetween. The web imparts significant structural rigidity and preferably meets the base portion of the pivoting end and the top portion at acute angles. Preferably, the acute angles are the same and preferably the acute angle is in the order of 60°. The web is preferably of substantially the same width as the downwardly extending wall of the attachment portion and preferably has ends aligned with the ends of the downwardly extending wall. The intermediate member is preferably arranged to receive a pair of rectangular cross-sectioned tubing (box-section) members of the apparatus or, more preferably, of a frame for the apparatus so that all four sides of the tubing abut at least one edge provided by the connection portion. The box-section members may be secured to the attachment portion of the intermediate member by any convenient means but are preferably welded thereto. Preferably, each box-section member fits below the top portion of the attachment portion of the intermediate member with a forward end of the member resting atop the base portion between the web and one of the upstanding walls of the base portion. The intermediate member can preferably be formed from a sheet of metal by sheet metal working operations including cutting, stamping, punching and folding.

In a ninth aspect, the present invention provides an intermediate member arranged to be pivotally mounted to both a first link member according to a seventh aspect of the present invention and to a second link member according to a eighth aspect of the present invention and arranged to be secured, in use, to the apparatus or a frame therefore.

In a tenth aspect, the present invention provides a kit of parts for a mounting assembly according to the fourth aspect of the present invention.

In an eleventh aspect, the present invention provides an item of equipment comprising:

an apparatus angularly moveable between a first storage position and a second, working position;

a mounting assembly for supporting the apparatus in a cantilever configuration in its second position and facilitating angular movement of the apparatus between the first and second positions, said mounting assembly comprising a support member, a first link member pivotally attached at a first end thereof to the support member and at a second end thereof to the apparatus and a second link member pivotally attached at a first end thereof to the support member and at a second end thereof to the apparatus, and wherein interaction between the first and second link members restricts angular movement of the apparatus beyond the second position and supports the apparatus in the second position wherein the width of the apparatus is of the same order of magnitude as the width of the first and second link members.

Preferably, the mounting assembly is in accordance with the fourth aspect of the present invention. It will be appreciated that even if the mounting assembly is not in accordance with the fourth aspect, features which are considered preferable in relation to the fourth aspect may also be incorporated.

Preferably, the item of equipment includes a single mounting assembly located substantially at a lateral centre of the apparatus and having sufficient torsional rigidity to avoid undue lateral twisting of the apparatus.

Preferably, the first and second links are of approximately the same width.

Preferably, the first and second links are between one fifth and three quarters of the width of the apparatus. Preferably, the first and second links are about half as wide as the apparatus.

In a twelfth aspect, the present invention provides an assembly comprising an apparatus and a mounting assembly for angularly moving the apparatus between a first, storage position and a second, working position and for supporting the apparatus in the second position, including a cover which may be located on the apparatus when the apparatus is in the storage position so as to substantially conceal the apparatus, which may be fully removed from the apparatus and located onto the mounting assembly in a cover storage position such that the mounting assembly and the apparatus are operable without interference from the cover.

Preferably, the cover is adapted to clip onto the apparatus when the apparatus is in its working position.

Preferably, the mounting assembly provides hook portions adapted to receive the cover to support and cover in its storage position. Most preferably, the hook portions depend from the limbs of the support member.

BRIEF DESCRIPTION OF THE DRAWINGS

In order that the invention may be readily understood and put into practical effect, references will now be made to preferred embodiments shown in the accompanying drawings in which:

FIGS. 32, 32A, 32B, 32C and 32D are respectively front, vertical cross-sectional, horizontal cross-sectional, side and perspective views of a support member of the mounting assembly which is a slight variation of that shown in FIG. 25;

FIGS. 33, 33A, 33B and 33C are respectively front, top, vertical cross-sectional and perspective views of a mounting plate which is a slight variation of that shown in FIG. 25;

FIGS. 36A, 36B, 36C, 36D and 36E illustrate the operation of an embodiment including a cover; and FIG. 37 is a perspective view of an embodiment including a cover and an iron stand.

PREFERRED EMBODIMENTS

Figure 1:
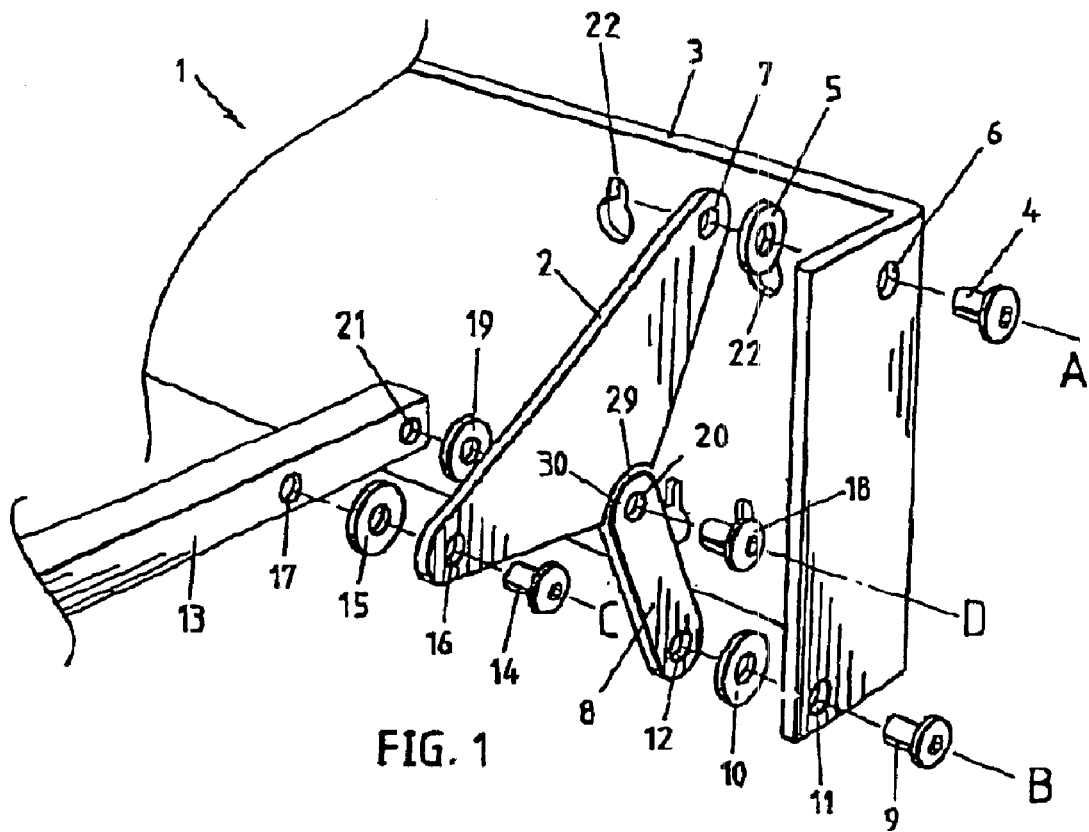
FIG. 1 is an exploded perspective view of a support means.
Figure 2:
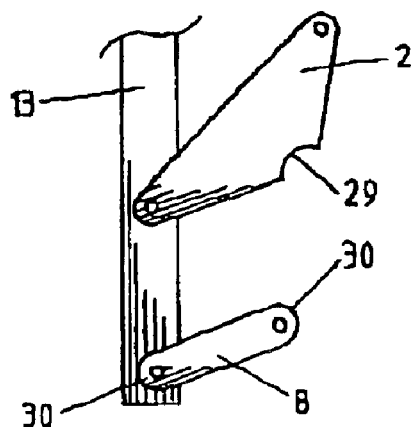
FIG. 2 is a side view of the support means of FIG. 1 when in a stored position.

Referring to FIGS. 1 and 2, there is illustrated a mounting assembly or cantilevered support means 1 having a first link or support member 2, second link or support member 8, and movable member 13.

First link or support member 2 can be pivotally mounted to an upright support structure in the form of a mounting plate 3, pivoted about a first horizontal axis A. A pivot pin 4 can be inserted through apertures 6, 7 and washer 5 to provide the pivotal mounting of the first link at a first end thereof about horizontal axis A.

Second link or support member 8 can be pivotally mounted to plate 3 about a second horizontal axis B. A pivot pin 9 can be inserted through apertures 11, 12 and washer 10 to provide the pivotal mounting of the second link at a first end thereof about horizontal axis B.

Angularly movable member 13 can be pivotally mounted to first support member 2 at a second end thereof about a third horizontal axis C. Again a pivot pin 14 can be inserted through apertures 16, 17 and a washer 15 can provide a pivotal mounting about horizontal axis C. Member 13 can be pivotally mounted to second support member 8 at a second end thereof about a horizontal axis D by a pivot pin 18 inserted through apertures 20, 21 and washer 19.

When pins 4, 9, 14 and 18 have been inserted as described above they may be fixed against being removed by their inserted ends being peened by any known method.

First support member 2 may have a heel portion as shown which can provide a female engagement means or concavity 29 which can be engageable with an end of second support member 8 which provides a complementary male engagement means or convex end 30.

Plate 3 may be provided with slotted apertures 22 for mounting to a wall or other support structure. When disposed as in FIG. 1 the member 13 is in an operative or working position in which the lock, limit, stop or engagement means 29 and 30 may engage with each other.

FIG. 2 illustrates the disposition of the support member 2 when in a stored position in which engagement means 29 and 30 are disengaged.

Referring to FIGS. 3 to 6 there is illustrated a foldaway ironing board assembly 23 which is supported from an upright support structure such as a wall to which plate 3 is mounted by screws passing through slotted apertures 22. Foldaway ironing board assembly 23 can include an elongate ironing board member 24, mounted to a generally U-shaped bent tubular bar whose arms can provide two spaced apart angularly movable members 13 of two support means 1 each of which can be mounted to opposite ends of plate 3 as described above. Ironing board member 24 preferably includes a frame 25 and a planar ironing surface, ideally formed from an expanded metal grid 26. Ironing board member 24 is ideally foldable about at least one transverse axis T1 and preferably a cushioned cover 27 may cover grid 26. A storage cover 28 can also be provided and is preferably pivotally mounted to one end of parallel arms 31, the other end of arms 31 being pivotally mounted to plate 3.

Figure 3:
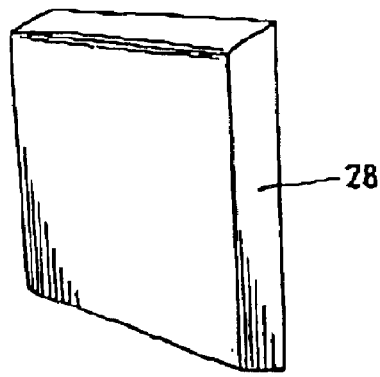
FIGS. 3 to 6 are perspective views of a foldaway ironing board assembly including the support means of FIGS. 1 and 2.
Figure 4:
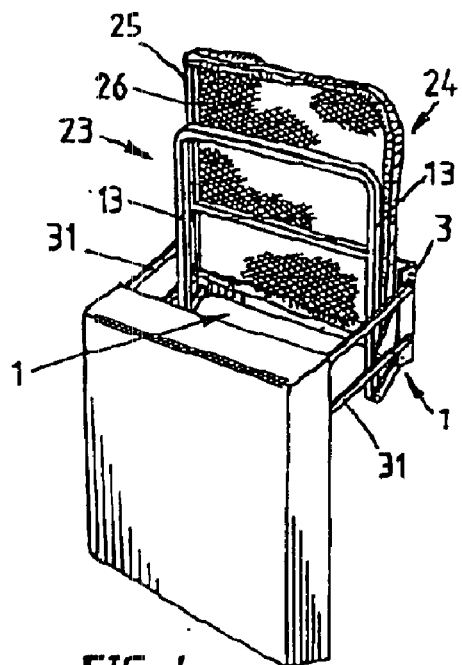
Figure 5:
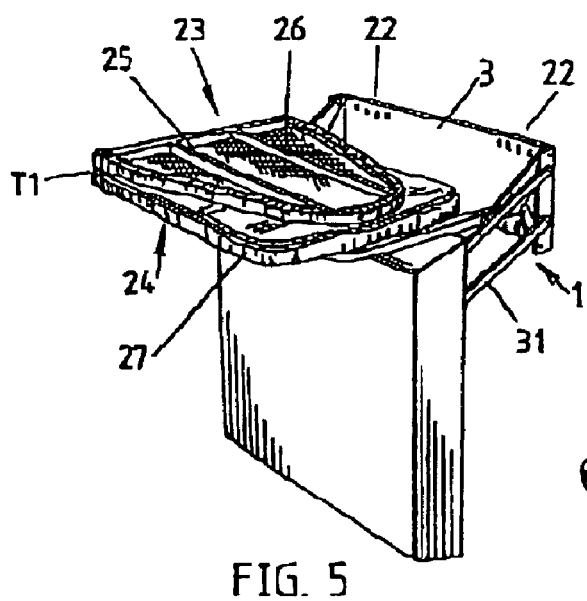
Figure 6:
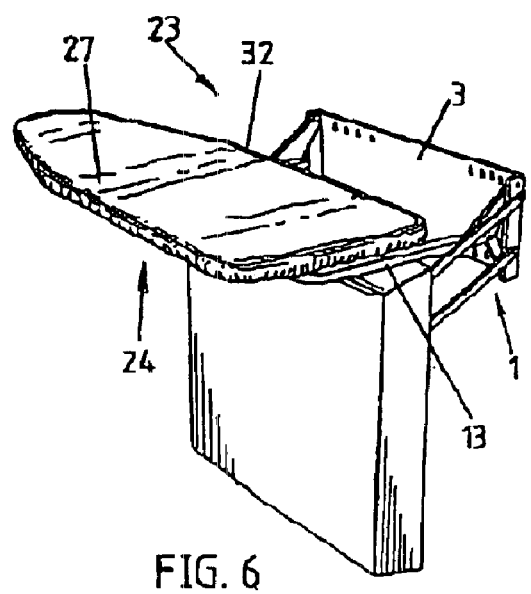

When in a stored position, shown in FIG. 3, foldaway ironing board assembly 23 is covered by storage cover 28 which may have a magnetic catch (not shown). When foldaway ironing board assembly 23 is desired to be used, storage cover 28 is moved to the position as shown in FIGS. 4 to 6. Ironing board member 23 is then pulled down from a vertical stored position shown in FIG. 4 to a horizontal position as shown in FIG. 5. In this regard both support means 1 move from the position as shown in FIG. 2 to the position shown in FIG. 1 and thereby engagement means 29 and 30 become engaged thereby restraining movement of support means 1. Ironing board member 24 may then be unfolded about pivotal axis T1 to an operative position in which a longitudinal edge 32 is in close proximity to plate 3 and a portion of support means 1 extends between longitudinal edge 32 and the plate 3. When ironing board assembly 23 is no longer required to be used it can be stored by a reverse operation to that as described above.

Referring to FIGS. 7 to 10 there is illustrated a second embodiment of a foldaway ironing board assembly 32. To avoid repetition the only differences between the above first embodiment will be described.

A retractable cantilevered support means 34 can include support members 2, 8 and plate 35 preferably mounted at unsupported ends of two telescopic arms 36 slidably mounted to respective runners 37 ideally located inside a support structure, which in this embodiment is an upright wall 39 of a storage area under a bench top 38. A further plate 35 can be mounted intermediate the ends of arms 36 and they are preferably pivotally mounted to each plate 35 on pairs of links or support members 2, 8. Member 40 of support means 34 is pivotally mounted to links 2, 8. Also ideally mounted to the outermost angularly movable support member 40 is a threaded locking pin 41 for releasable engagement with a threaded aperture 42 on outer plate 35.

Figure 7:
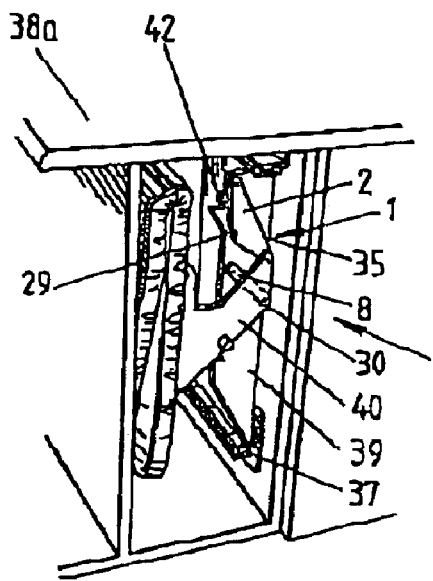
FIGS. 7 to 10 are perspective views of a second preferred embodiment of the invention.
Figure 8:
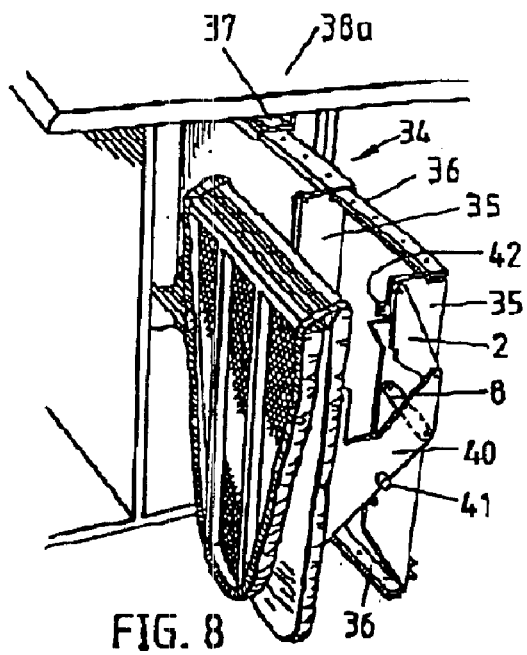
Figure 9:
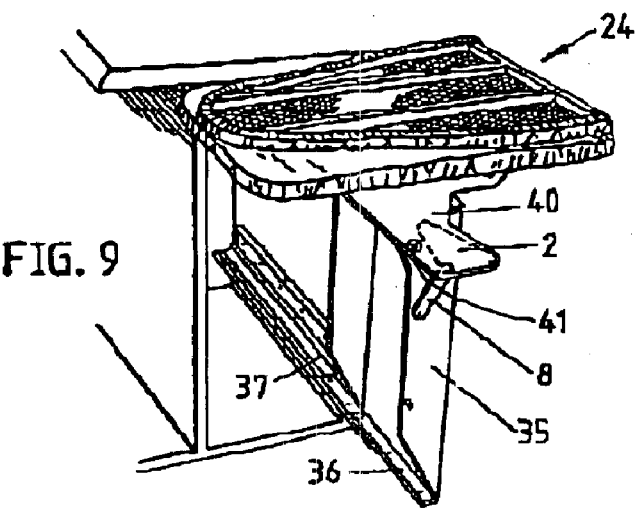
Figure 10:
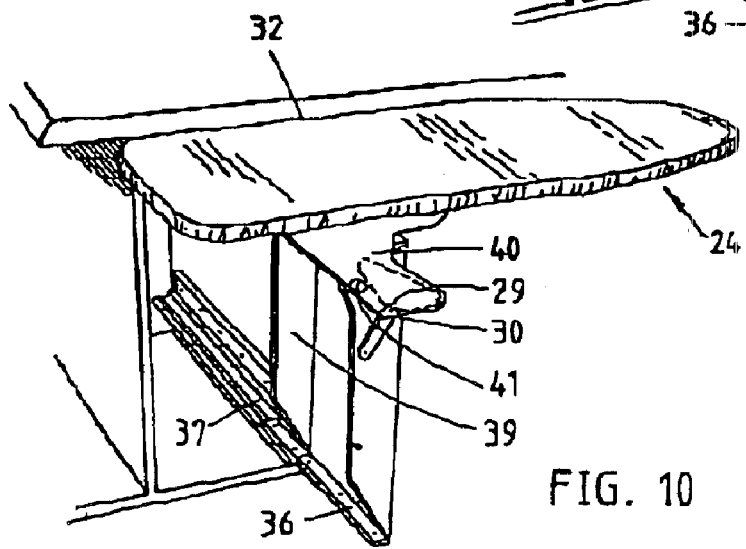

Ironing board member 24 can be mounted to each angularly movable support member 40 such that when in the operative position shown in FIG. 10, longitudinal edge 32 is in close proximity to the support structure upright wall 39 and a portion of support means 34 (i.e. a portion of arms 36) extends between upright wall 39 and longitudinal edge 32. When the board which is shown in FIG. 7 is desired to be used, the fold away ironing board assembly 32 and the telescopic arms 36 are extended as shown in FIG. 8. Ironing board member 24 is then rotated to through 90° as shown in FIG. 9 in which engagement means 29, 30 move from a disengaged relationship to an engaging relationship. Locking pin 41 may then be screwed into aperture 42 to provide a positive locking of ironing board assembly 32. The ironing board member 24 can be unfolded ready for use. When it is no longer required to be used assembly 33 can be stored by a reverse operation to that as described.

Figure 11:
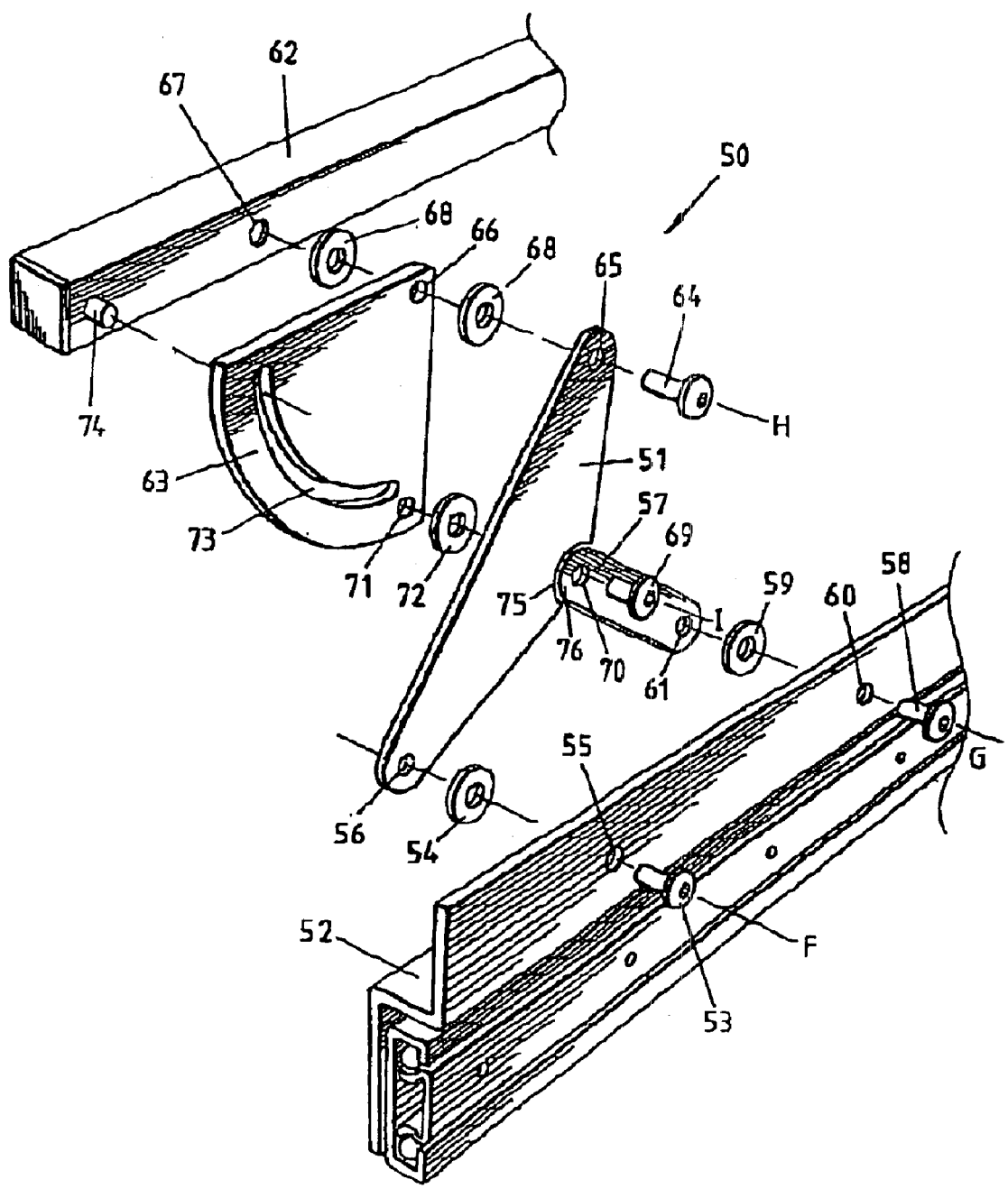
FIG. 11 is an exploded perspective view of another preferred embodiment of a support means.

Referring to FIG. 11, there is illustrated a further embodiment of a support means 50 which can include a first support member 51, second support member 57, third support member 63, movable member 62 and a retractable telescopic arm 52.

First support member 51 is preferably pivotally mounted to retractable telescopic arm 52 about a first horizontal pivotal axis F. Pivot pin 53 inserted through apertures 55, 56 and washer 54 provides the pivotal mounting about horizontal axis F. Second support member 57 can be pivotally mounted to arm 52 about a second horizontal axis G. Pivot pin 58, inserted through apertures 60, 61 and washer 59 provide the pivotal mounting about horizontal axis G. First and third support members 51, 63 and movable member 62 are ideally pivotally mounted about a common horizontal axis H by pivot pin 64 inserted through apertures 65, 66, 67 and washers 68. Further, third support member 63 is ideally pivotally mounted to second support member 57 about a horizontal axis I by pivot pin 69 inserted through apertures 70, 71 and washer 72. When pivot pins 53, 58, 63, 69 have been inserted as described, they may be fixed against being removed when their ends are peened.

Third support member 63 has an arcuate slot 73 which can receive a pin 74 protruding from movable member 62. Furthermore first support member 51 can have a female engagement means 75 for engagement with a male engagement means 76 located at one end of second support member 57.

Figure 12:
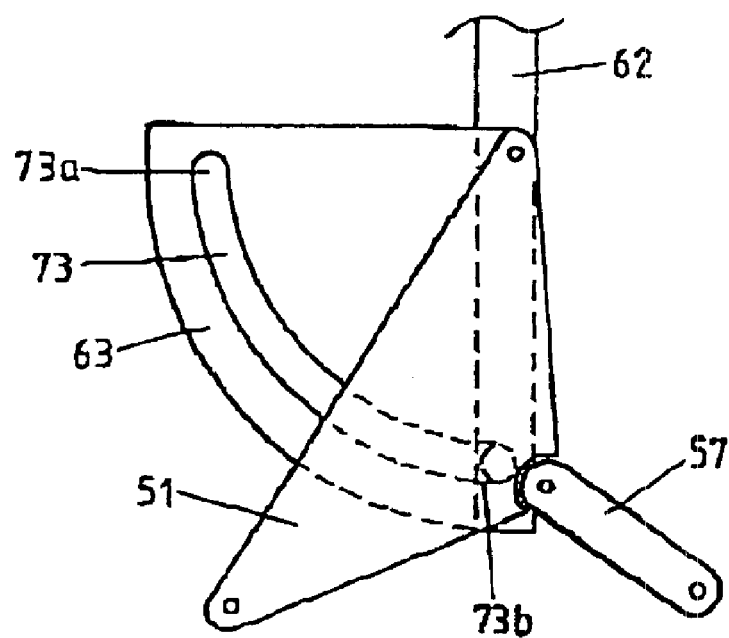
FIGS. 12 and 13 are side views of the support means of FIG. 11 when rotated from the position of FIG. 11 through 90° and 180° respectively.
Figure 13:
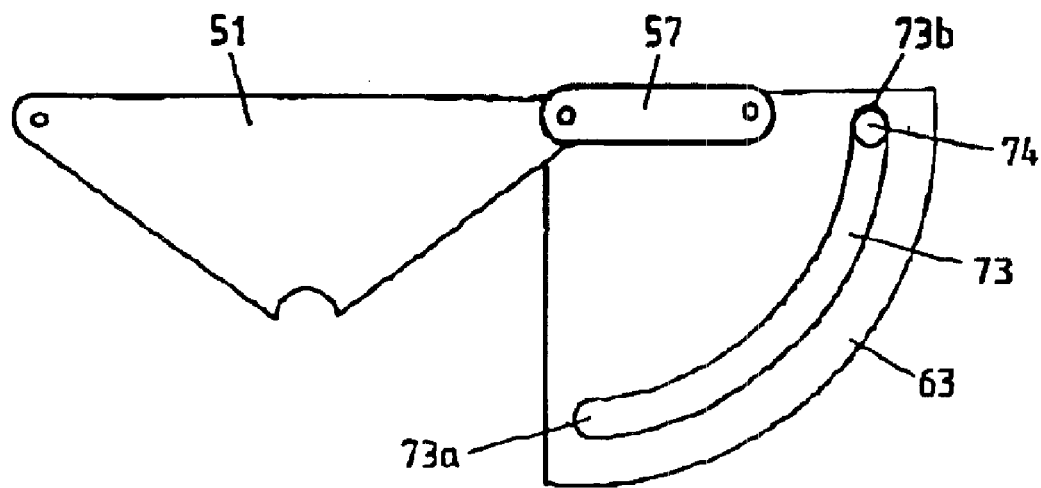
Figure 14:
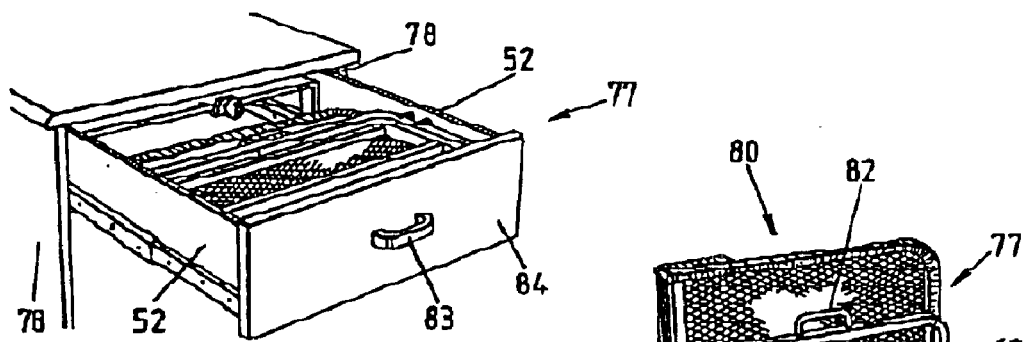
FIGS. 14 to 18 are perspective views of a third embodiment of the invention including the support means of FIGS. 11 to 13.

FIG. 11 shows the assembly in an operative position in which pin 74 limits movement of movable member 62 by abutting end of arcuate track 73. Referring to FIG. 12, movable member has been rotated through 90° and therefore pin 74 has moved along arcuate track 73 to its end 73b. Accordingly, further rotation of third support member disengages engagement means 75, 76 as shown in FIG. 13 which thereby allows third support member to be rotated through another 90° resulting in 180° rotation in total.

Referring to FIGS. 14 to 18, there is illustrated a further embodiment of a foldaway ironing board assembly 77 which can be supported from a support structure such as supporting walls 78 of a sliding drawer assembly. Two retractable telescopic arms 52 of a respective cantilevered support means 50 are ideally slidably mounted to runners associated with a respective upright supporting wall 78.

Foldaway ironing board assembly 77 can include an ironing board member 80 identical to that of FIGS. 3 to 6 and therefore to avoid repetition is not described again. Ironing board member 80 can be mounted to a bent tubular bar 81 with a handle 82 mounted thereto.

Tubular bar 81 can be used to provide two third support members 62.

Figure 15:
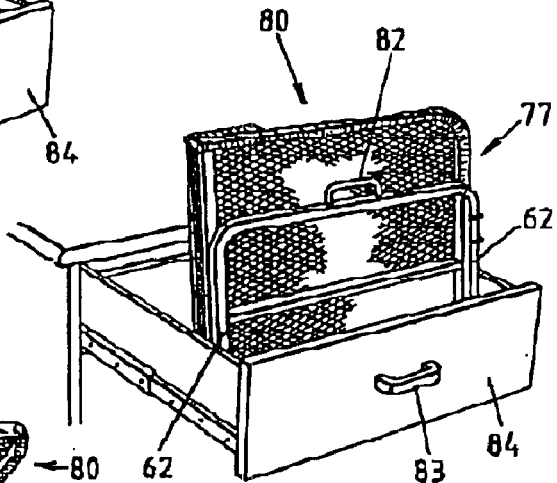
Figure 16:
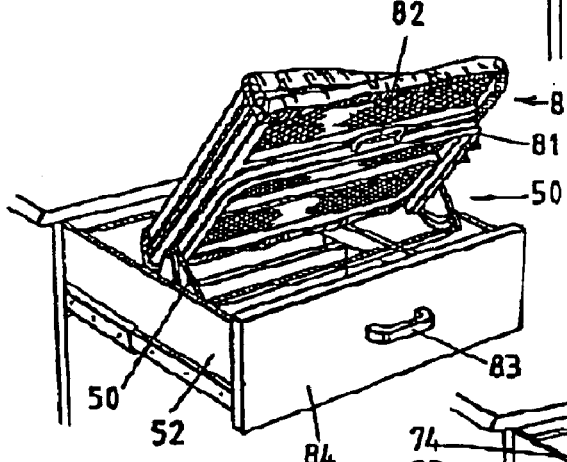
Figure 17:
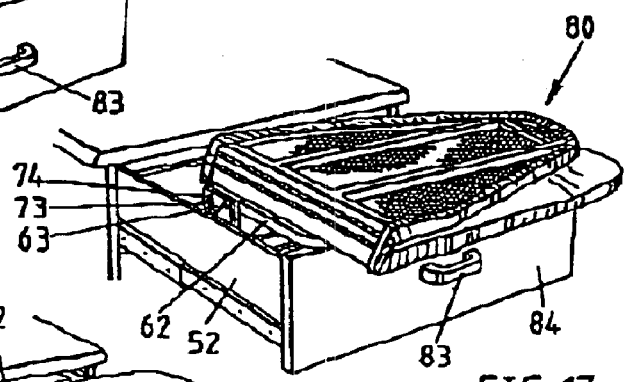
Figure 18:
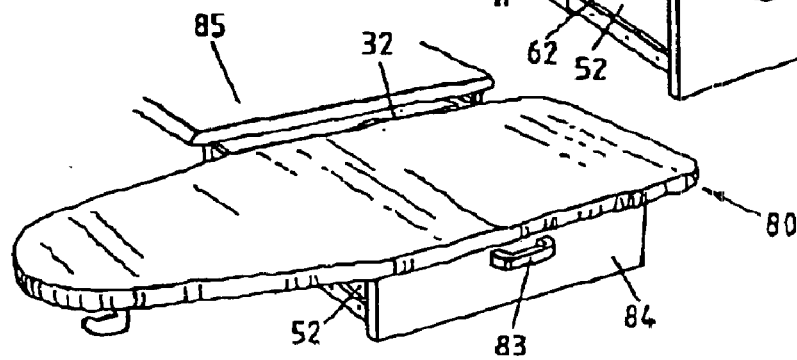

Accordingly, foldaway ironing board assembly 77 has two support means 50 as described in FIGS. 11 to 13. When foldaway ironing board assembly 77 is desired to be used a handle 83 mounted to front drawer wall 84 which is mounted to ends of telescopic arms 52 is used to pull arms 52 to the extended position shown in FIG. 14 when in this position each of support means 50 is in the position shown in FIG. 13. Handle 82 may then be used to rotate board member through 180° as shown in FIGS. 15, 16 and 17 in which 90° corresponds to the position shown in FIG. 12. Due to the arrangement of support means 50, lifting of board member 80 causes it to be raised to clear drawer wall 84. After board member 80 has been pivoted through 180° it is unfolded into an operative position ready for use as illustrated in FIG. 18. When in this position a longitudinal edge 32 is in close proximity of support structure 85. When it is no longer required to be used, assembly 77 can be stored by a reverse operation to that as described.

Figure 19:
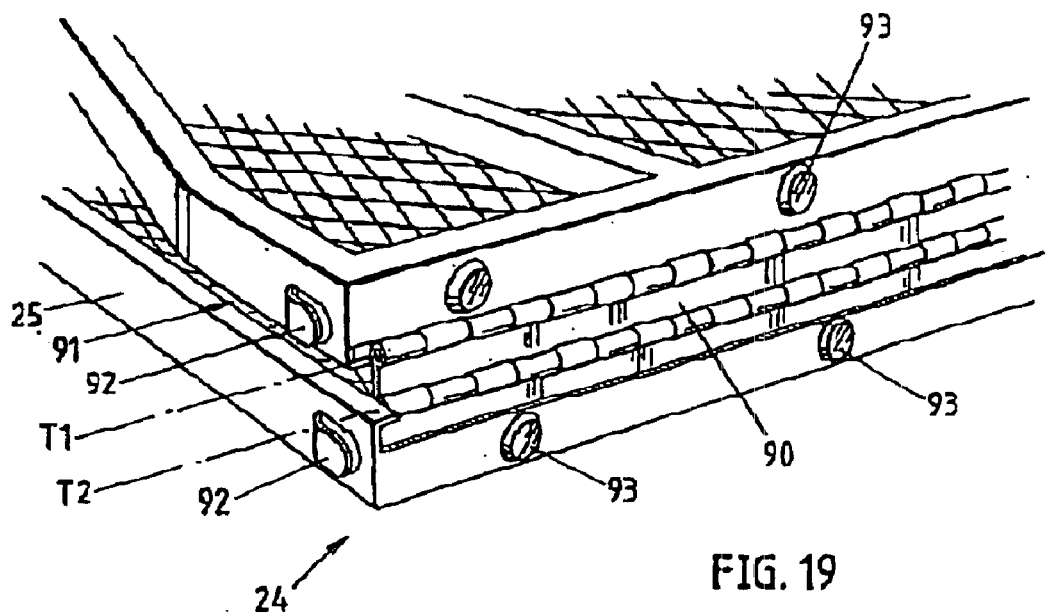
FIG. 19 is a perspective view of a hinge used to fold an ironing board member as used in the invention.

Referring to FIG. 19, a double hinge 90 is illustrated which can be mounted to board member 24 to provide pivotal movement about adjacent transverse axes T1 and T2. This therefore allows a space 91 to accommodate a cushioned cover 28 (not shown in FIG. 19) when sandwiched by board member 24 when in the folded position as shown.

Further, there are tabs 92 protruding from frame 25 for engaging and holding cushioned cover 28 and protrusions 93 ensure a planar ironing surface is provided when board member 24 is unfolded to the operative position.

Figure 20:
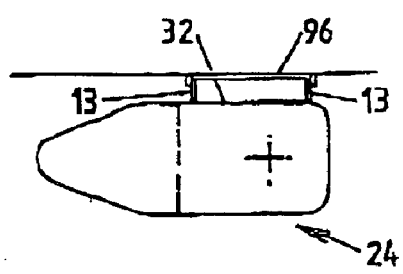
FIGS. 20 to 22 illustrates a pivot means which can be used in the invention.
Figure 21:
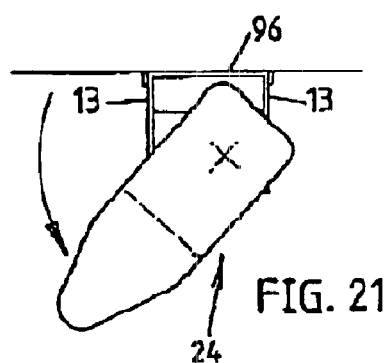
Figure 22:
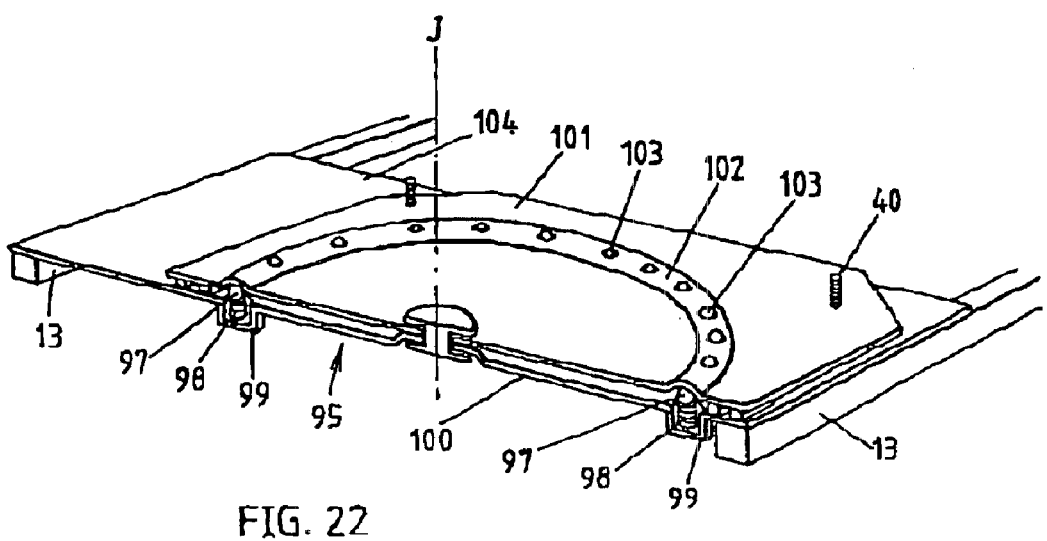

Referring to FIGS. 20 to 22, there is illustrated a pivot means 95 for selectively allowing limited rotation of board member 24 about a vertical axis J. Therefore board member 24 can be selectively rotated as illustrated by the arcuate arrowed line to positions other than edge 32 being parallel to support structure 96. The pivot means as includes ball bearings 97 biassed by springs 98 mounted in an arcuate track 99 which is part of a base plate 100 mounted to, for example, the links of the above described mounting mechanism. Pivotally attached about vertical axis J is a rotatable plate 101 with an arcuate track 102 having apertures 103 therein for engagement with ball bearings 97. Bolts 104 allow for mounting of ironing board member 24 (of FIG. 19) to rotatable plate 101 and selective positioning about vertical axis J of board member 24 is provided by rotation of plate 101 relative to base plate 100.

During this rotation ball bearings 97 engage apertures 103 to restrict pivotal movement when a desired position has been obtained.

Figure 23:
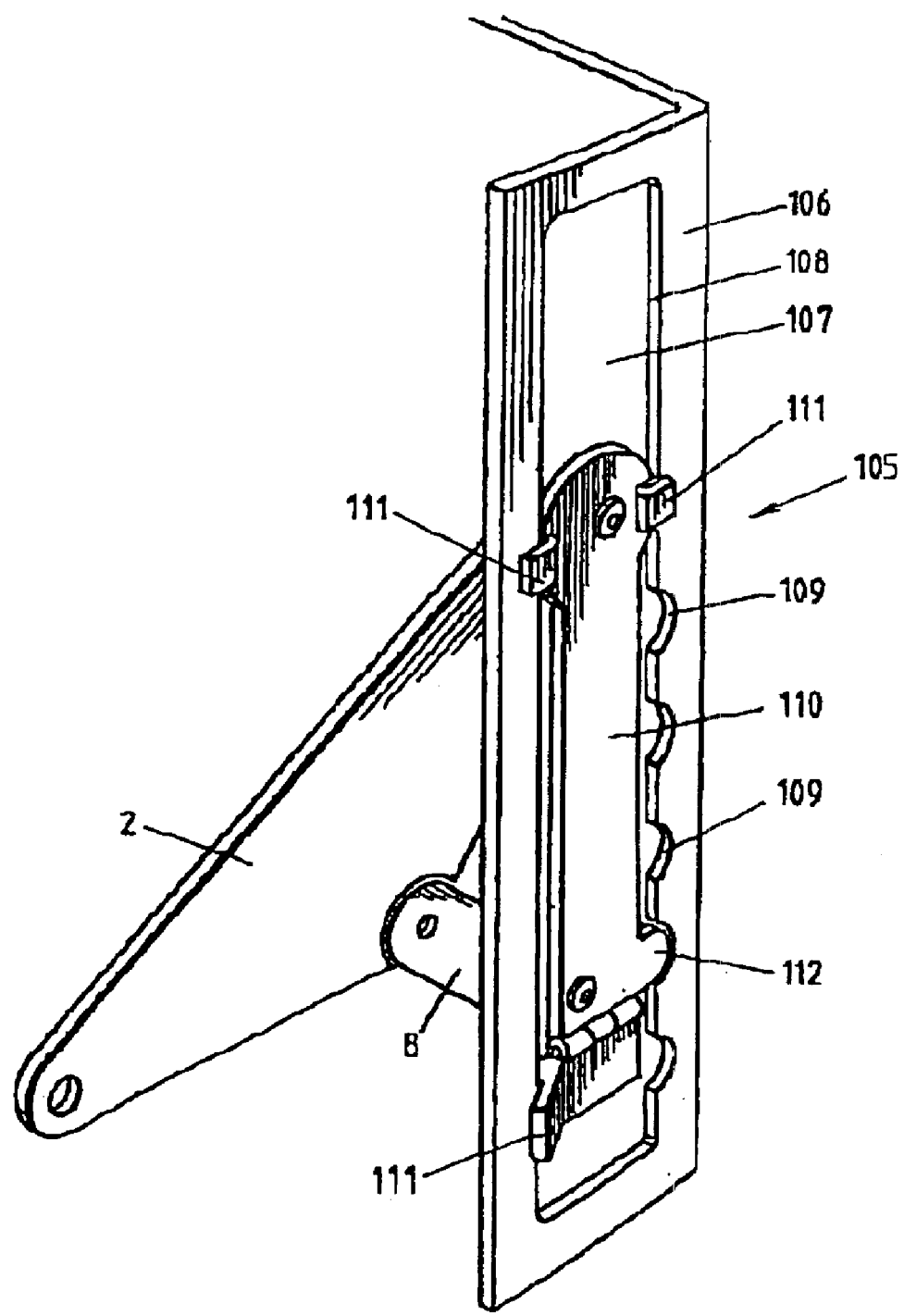
FIG. 23 illustrates a perspective view of a height adjustment means.

Referring to FIG. 23, there is illustrated a height adjustment means 105 comprising a mounting plate 106 with a slot 107 punched therein. Along one longitudinal edge of slot 107 are a plurality of female engagement means in the form of recesses 109.

Height adjustment means 105 can also include a moveable plate 110 which is held captive in slot 107 by tabs 111. At a lower end of plate 110 is a male engagement means in the form of protrusion 112 for engaging with one of recesses 109. Height adjustment means 105 can replace, for example, plate 3 as described in FIG. 1. Accordingly, first support member 2 and second support member 8 are pivotally mounted to plate 110 and height adjustment is effected by selective engagement of protrusion 112 with one of recesses 109. Once engaged the weight of ironing board member 24 assists in maintaining engagement of protrusion 112 in one of recesses 109.

Figure 24:
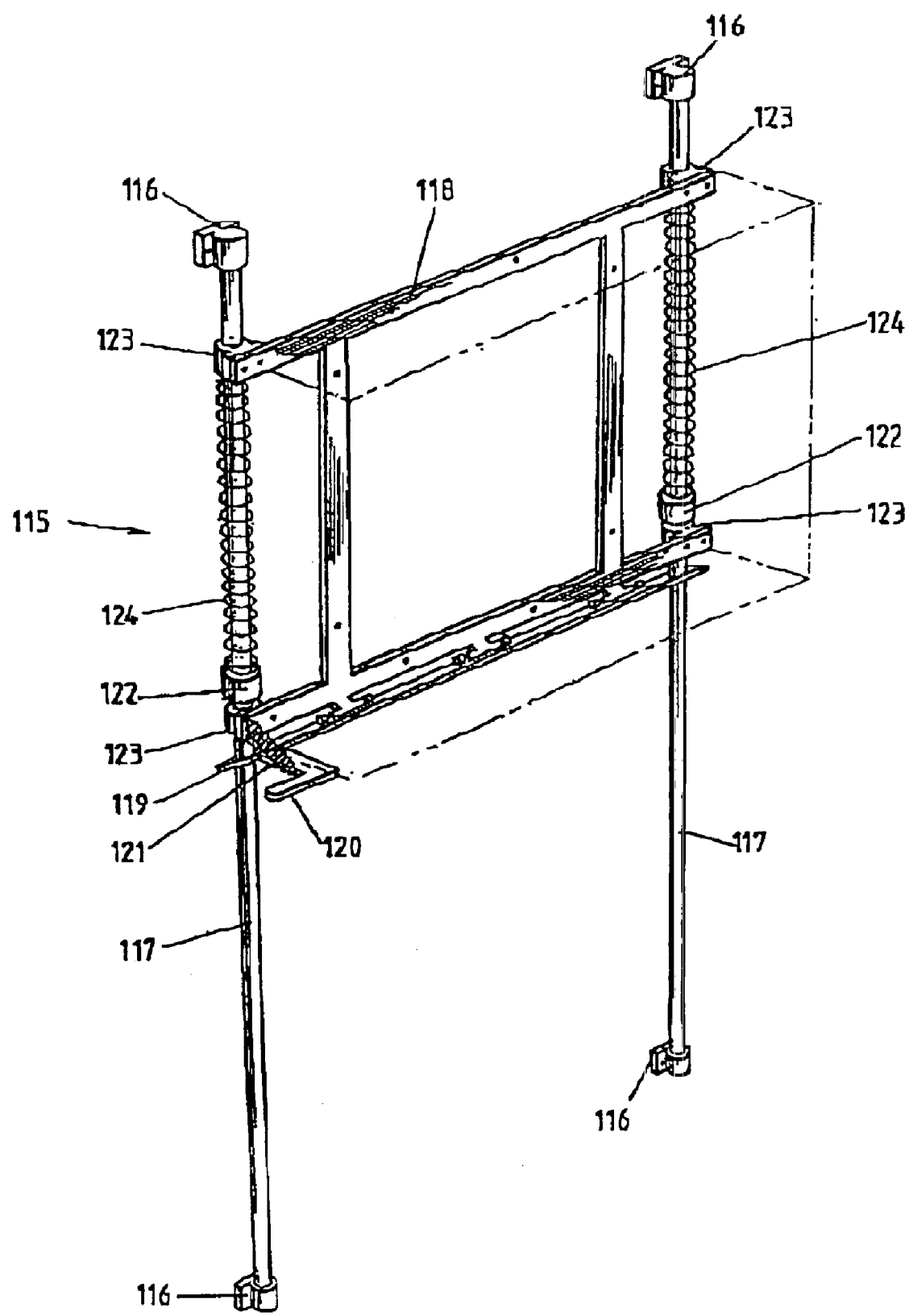
FIG. 24 is a perspective view of an adjustable mount.
Figure 25:
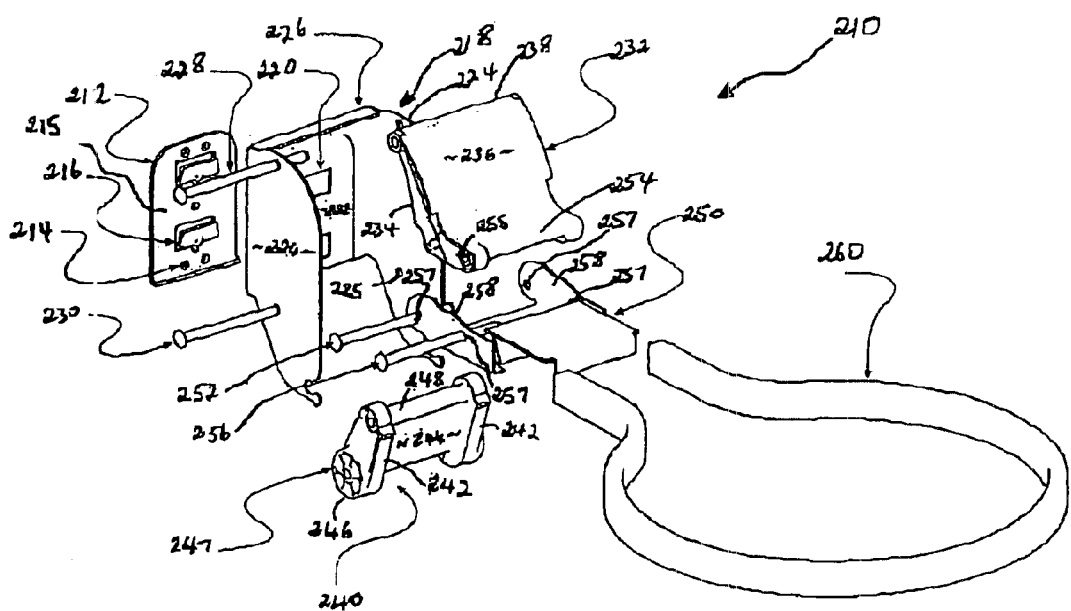
FIG. 25 is an exploded perspective view of an alternative embodiment of the present invention and a frame for a foldaway ironing board.

Referring to FIG. 24, there is illustrated an adjustable mount 115 for the foldaway ironing board assembly 23 illustrated in FIGS. 3 to 6. Mount 115 includes wall mounting means in the form of two pairs of spaced apertured plates 116 and two parallel upright tracks 117 each being mounted at its ends to one of plates 116. Mount 115 also includes an ironing board mounting means in the form of an apertured frame 118 slidably mounted to tracks 117. To selectively limit movement of frame 118 relative to tracks 117 a lock 119 is pivotally mounted to frame 118. Lock 119 has a handle 120 biased by spring 121 to a locked position in which lock 119 grips tracks 117. To release frame 118 from the locked position handle 120 is pushed downwards and allows frame 118 to slide along tracks 117 to provide height adjustment of foldaway ironing board assembly 23 when mounted to frame 118. Collars 122 are fixed to respective tracks 117 and between an upper slidable frame mount 123 and a respective collar 122 there is mounted a spring 124 for biasing frame 118 to upper ends of tracks 117. In use, mount 115 allows height adjustment of a mounted foldaway ironing board assembly 23 which is beneficial for a household of people with different heights in which one or more of the people may be confined to a wheelchair.

Further embodiments of the invention will be described with reference to FIGS. 25 to 37.

The mounting assembly 210 is securable to a single stud of a cavity wall via mounting plate 212 which is formed with five apertures 214 for screwing the mounting plate 212 to the stud (not shown). The mounting plate 212 is formed with two lugs 216 which project upwardly and outwardly from a face of the mounting plate 212 at an acute angle to the face. A support member 218 is releasably securable to the mounting plate 212 via two slots 220 which pass over the lugs 216 wedging parts of a body portion 222 of the support member 218 between the lugs 216 and a face 215 of the mounting plate 212. The mounting plate 212 is formed from a sheet of 3 mm mild steel.

A pair of vertically extending limbs 224 project normally from the sides of body portion 222 and are separated by a distance of about 120 mm. The limbs 224 have lower portions which project below the body portion 222. Upper portions of the limbs 224 project away from the top of the body portion 222 and are spanned by a head portion 226 which projects normally from the top of the body portion 222 has ends 227, respectively welded to each of the limbs 224. The limbs 224 are formed with aligned upper and lower pairs of apertures 225 arranged to receive upper and lower pivot pins 228 and 230 respectively. The support member 218 is formed from a sheet of 2 mm mild steel, and is powder coated.

A first link member 232 has a pair of link arms 234 and a body portion 236 therebetween. A first end 238 of the first link member 232 has a continuous bore passing therethrough which is arranged to receive the upper pivot pin 228 and thereby to pivotally mount the first link member 232 to the support member 218.

A second link member 240 has a pair of link arms 242 and a body portion 244 therebetween. A first end 246 of the second link member 240 is formed with a continuous bore through the link arms 242 and body portion 244 which is arranged to pivotally mount second link member 240 to support member 218 via lower pivot pin 230. The first end 246 takes the form of an enlarged boss 247 as compared with the second end 248 of the second link member 240. The boss 247 is enlarged for the purpose of bearing against the insides of limbs 224 when pivotally mounted thereto by lower pivot pin 230. Lower pivot pin 230 is arranged to be tightened and loosened and thereby vary the pressure exerted on the boss 247 by the limbs 224 to enable interaction between the boss 247 and the limbs 224 to function as a breaking type system in movement between a working position as illustrated in FIG. 26 and a storage position as illustrated in FIG. 28.

The second end 248 of the second link member 240 is also formed with a continuous bore through link arms 242 and body portion 244 and is arranged to be pivotally mounted to an intermediate member 250 via end pivot pin 252 which is, in use, located proximal the end of the intermediate member 250. The second end 254 of first link member 232 is also formed with a continuous bore 255 through link arms 234 and body portion 238 with first link member 232 being pivotally mounted to intermediate member 250 via pivot pin 256 which passes through the continuous bore 255. Pivot pins 252 and 256 pass through aligned apertures in walls 258 of a pivoting end of intermediate member 250. A box-section frame 260 for a foldaway ironing board (not shown) is welded to intermediate member 250 as subsequently described in relation to FIGS. 30 and 31. Intermediate member 250 is formed from a sheet of 2 mm mild steel and given a powder coated finish. Box-section 260 is formed from mild steel having a wall thickness of 0.8 mm or 1.0 mm and is given a powder coated finish. First link member 232 and second link member 240 are injection moulded from glass filled nylon. A support plate 262 for the foldaway ironing board (not shown) is mounted on the box-section frame 260.

Figure 26:
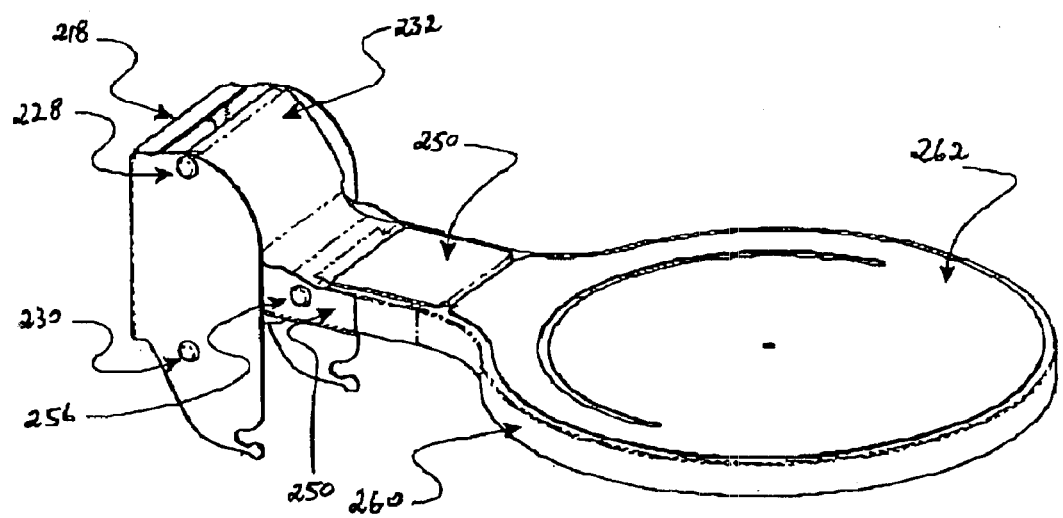
FIG. 26 is a perspective view of the embodiment of FIG. 25 following assembly in a working position with a support plate for the foldaway ironing board mounted on the frame.
Figure 27:
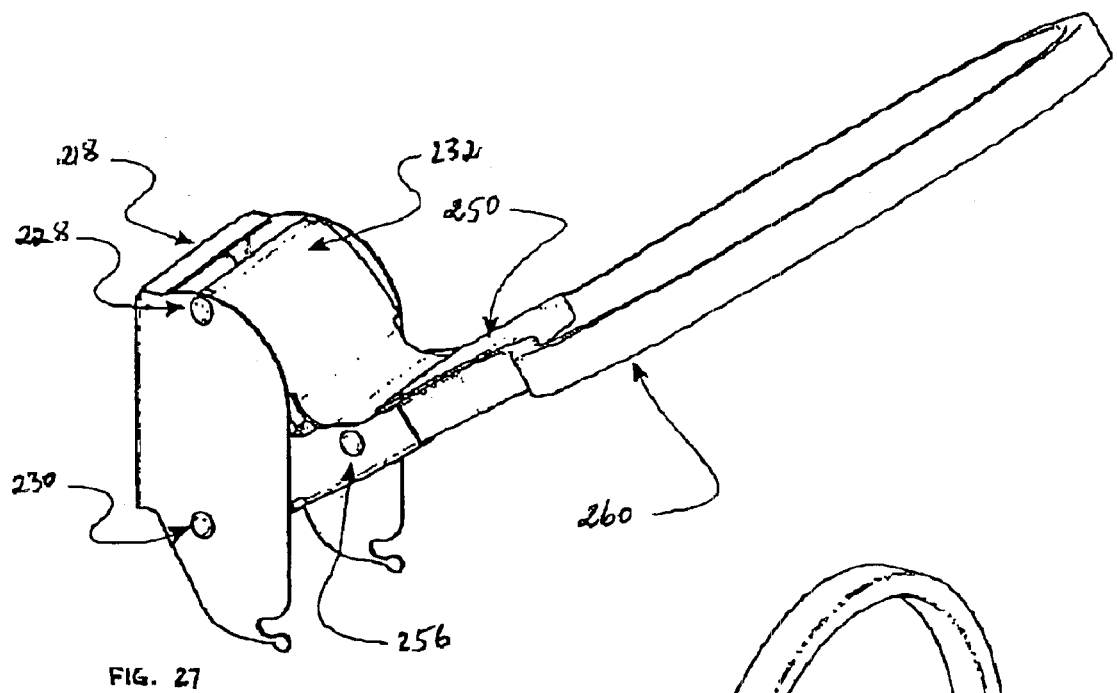
FIG. 27 is a perspective view equivalent to FIG. 26 with the mounting assembly, frame and support plate intermediate the working position of FIG. 26 and a storage position.
Figure 28:
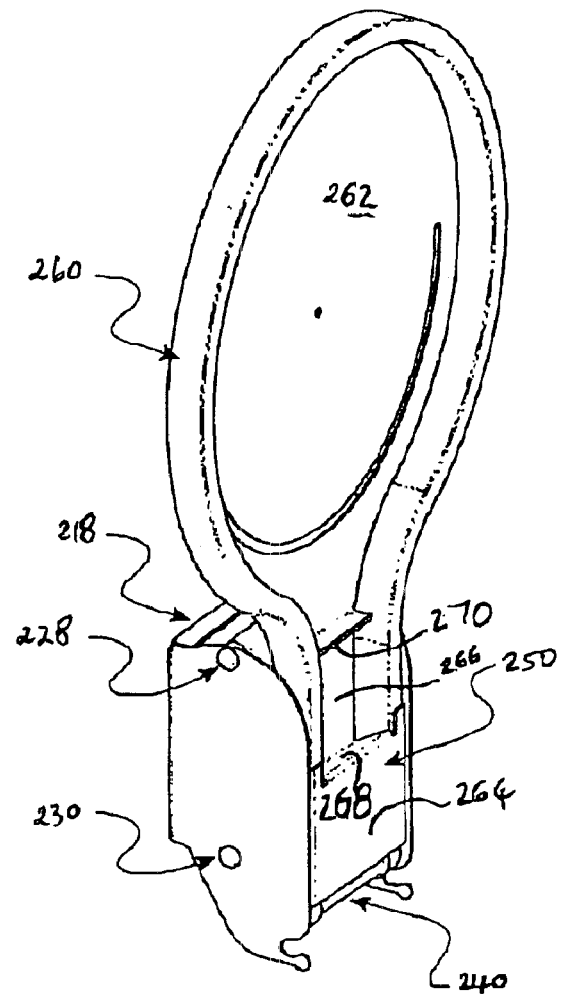
FIG. 28 is a perspective view equivalent to FIG. 26 with the mounting assembly, frame and support plate in the storage position.
Figure 29:
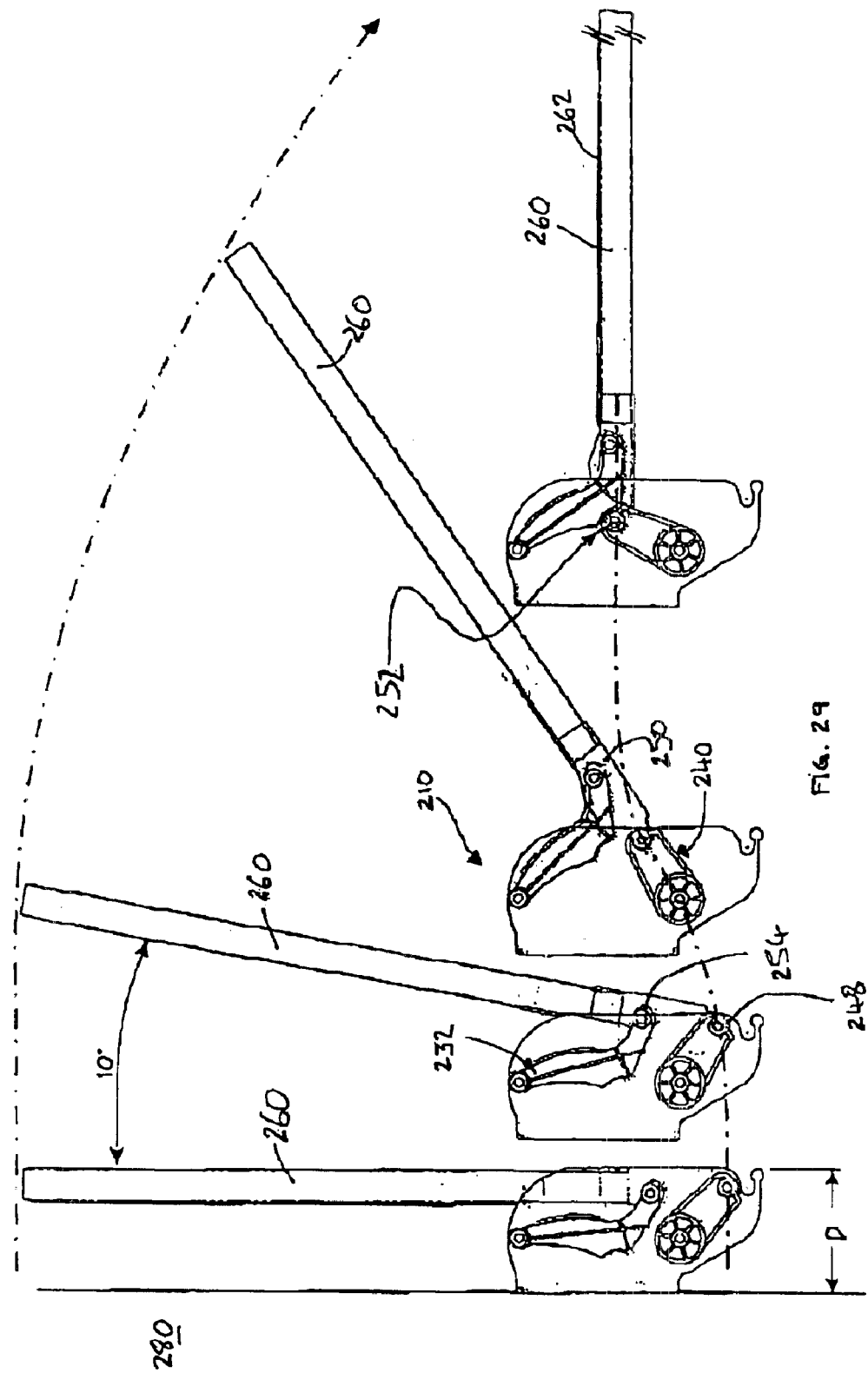
FIG. 29 is a side view of the mounting assembly, frame and support plate of FIG. 25 in progressive movement between the storage position and the working position.

FIG. 29 is a side view of the mounting assembly 210, frame 260 and support plate 262 of FIGS. 26 to 28 in progressive movement between the storage position illustrated at the far left of FIG. 29 and the working position illustrated at the far right of FIG. 29. The first link member 232 and second link member 240 are shown in order to illustrate operation of the mounting assembly, and for clarity the intermediate member (250 in FIG. 25) is only partially shown, although it will be appreciated that in use the first and second link members 232, 240 are pivotally attached to the intermediate member at their respective second ends 248, 254. The four depictions in FIG. 29 show operation of the mounting assembly 210 as the frame 260 moves from a storage position in which it is substantially parallel to a vertical wall 280 (which acts as a support element) to a working position, shown at the far right of FIG. 29, in which it is substantially normal to the wall. The lower broken line in FIG. 29 illustrates the vertical position of the of pivot pin 252 in movement between the storage position and the working position and thus also the vertical position of the bore near the second end 248 of the second link member 240 and of the aperture in the intermediate member 250 through which the pivot pin 252 passes. The upper broken line illustrates the vertical position of the distal side 282 of the frame 260, which furthest from the intermediate member 250 and pivot pins 252, 256. While the drawings are spread across the page for clarity, it will be appreciated that, in use, the support member 218 does not move but remains attached to the wall 280 or supporting element via the mounting plate 212.

In the first stage of movement between a storage position and a working position, shown by the first and second left-most depictions of FIG. 29, the second ends 254, 248 of the first and second link members 232, 240 move away from the wall slightly upwardly keeping the height of the distal side 282 of the frame 260 substantially constant through about the first 10 degrees of its travel. Since the pivot pins 252, 256 and thus the intermediate member 250 both move upwards slightly during this part of the operation of the mounting assembly 210, and the distal end 282 moves neither up nor down, it will be appreciated that the centre of mass of the frame moves slightly upwards during this part of the operation. This arrangement helps prevent the frame falling accidentally from the storage position to the working position. The mounting assembly thus does not require locking means in either the storage or working position.

It will also be noted that as the frame 260 approaches the working position, a convex engagement portion 302 at the second end 248 of the second link member engages a stop means in the form of a concave engagement portion 301 of the first member 232. This engagement prevents angular rotation beyond the working position. Furthermore, the illustrated arrangement provides a very strong and compact cantilevered support. It will be appreciated that a downwards force applied to the distal end of the frame 260 in the working position would tend to force the first link member 232 downwardly and the second link member 240 upwardly, but the engagement of the first and second link members 232, 240 allows transmission of force between them, resisting the forces applied by the frame 260. It is to be noted that the forces are effectively resisted at least in part because in the working position, the link members 232, 240 are arranged so that the first end of link member 232, attached to the support member 218 is above the second ends of the link members 232, 240 and the first end of the second link member 240 is below the second ends of the first and second link members. Having the second ends of the link members intermediate the first ends (vertically intermediate in the illustrated orientation, but other orientations are possible) is highly advantageous over other arrangements. It will be appreciated that the mounting assembly 210 is very compact. A prototype has been made which, in its storage position, extends only 100 mm away from a vertical support element to which it is mounted (corresponding to distance D in FIG. 29). The described structure enables even such compact link members to robustly support a working surface in cantilevered configuration.

Elements of a preferred embodiment will be described with reference to FIGS. 30 to 37. The elements illustrated in these drawings may have some differences to the corresponding elements in FIGS. 25 to 29, but for convenience, corresponding reference numerals will be used except where stated otherwise.

Figure 30:
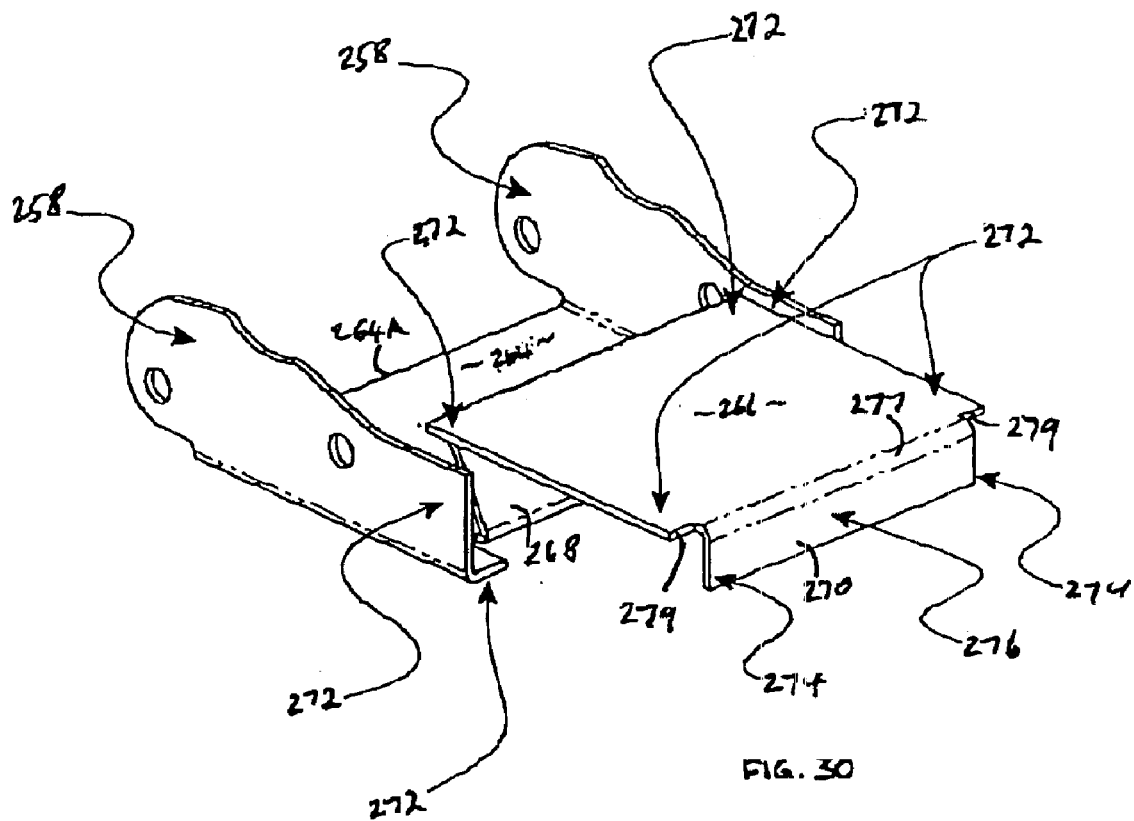
FIGS. 30 and 31 are perspective and schematic side views respectively of an intermediate member of the mounting assembly of FIG. 25.
Figure 31:
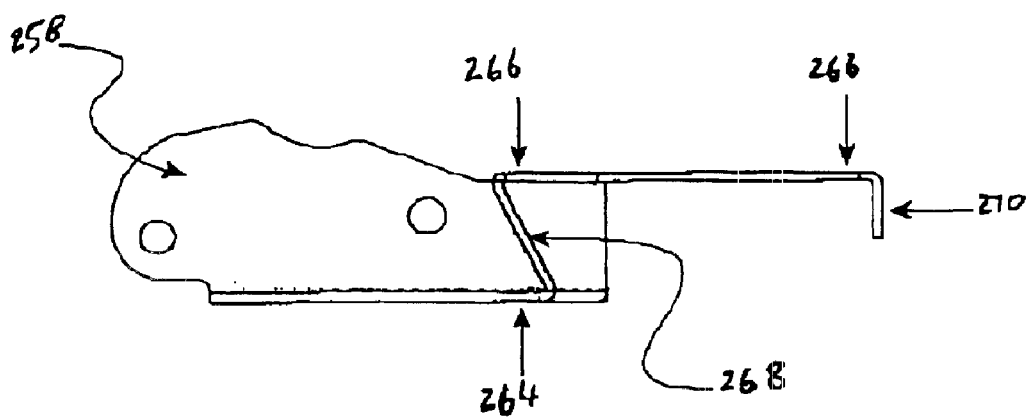

FIGS. 30 and 31 are detailed views of intermediate member 250 from which it can be seen that walls 258 upstand from base portion 264 which is connected to top portion 266 of an attachment end or attachment portion of intermediate member 250 via a web 268. The web 268 is inclined relative to the base portion 264 and top portion 266 so that together the base portion 264, top portion 266 and web 268 have a cross-sectional shape, which is generally Z-shaped (with extended top and bottom bars). A wall 270 extends downwardly from the edge 277 of the top portion 266 which is furthest from the web 268. The wall 270 is slightly narrower than the top portion 266 so that the wall 270 does not extend across the entire width of the edge 277, but leaves side portions 279 of edge 277 from which the wall 270 does not depend. The intermediate member 250 is arranged to receive box-section frame 260 and to be secured thereto by spot welds at points 272 and fillet welds at points 274. Thus, (considering the intermediate member 250 in the working position) the box section frame 260 is positioned vertically between parts of the base portion 264 and top portion 266 and laterally between parts of the walls 258 and the wall 270, and may be welded to each of these elements. Furthermore, the box section frame may be fillet welded to the edges of the web 268. Support plate 262 is spot welded to the wall 270 of intermediate member 250 at point 276. The engagement of the frame 260 to the intermediate member 250 is illustrated, to some extent in FIG. 28.

Detailed views of the support member 218 are shown in FIGS. 32, 32A, 32B, 32C and 32D. FIG. 32 is a front view; FIGS. 32A and 32B are cross-sectional views on 32A—32A and 32B—32B of FIG. 32, respectively; FIG. 32C is a side view and FIG. 32D is a perspective view. In the embodiment of FIGS. 32 to 32D, as can be best seen in FIGS. 32B and 32D, the body portion 222 includes a central recessed central portion 222A which extends between the bottom edge of the body portion and the head portion 226 of the body portion 218, and an outstanding portion 222B on each lateral side of the recessed portion 222A. The recessed portion is arranged to be slightly wider in width than a mounting plate 218 with which the support member 218 is being used. Thus, the recessed portion 222A engages the mounting plate 218 and is wedged between the lugs 216 and the face of the mounting plate 212, and the outstanding portions 222B rest in contact with, or close to, the wall 280 or other support element to which the mounting plate 212 is attached.

It should also be noted that, as shown best in FIG. 32D, one of the limbs 224 includes two circular apertures 225A and the other of the limbs includes two square apertures 225B, so that the pivot pins 228, 230 may be rotationally fixed by engagement of a portion with a square cross-section (not shown) with the square apertures 225B.

In this embodiment, the support member 218 includes an additional aligned pair of apertures 219 which may be used for locating an accessory, such as a stand for an iron.

The support member 218 includes a pair of hook portions 209 one at each of the front bottom corners of the respective limbs 224, for use in suspending a cover when the mounting assembly 210, and ironing board or other apparatus attached thereto, is in use. The hook portions 209 have rounded extremities for safety. The upper corners of the limbs 224 which are distal from the body 222 are rounded for safety and so that as the mounting assembly 210 is moved from a working to a storage position, the likelihood of trapping objects between the frame 260 and the limbs 224 is reduced.

Detailed views of the mounting plate 212 are shown in FIGS. 33, 33A, 33B and 33C. FIG. 33 is a front view; FIG. 33A is a view from above; FIG. 33B is a cross-section on 33B—33B of FIG. 33 and FIG. 33C is a perspective view. The apertures 214 are countersunk and upper corners 213 of the working plate 212 are rounded, to facilitate fitting of the support member 218. The lugs 216 each include a generally central, vertically extending strengthening ridge 217 and are slightly tapered to facilitate fitting of the support member 218. Since the mounting plate 212 is, in use, substantially covered by the support member 218, powder coating is not required and zinc plating is preferred.

Figure 34A:
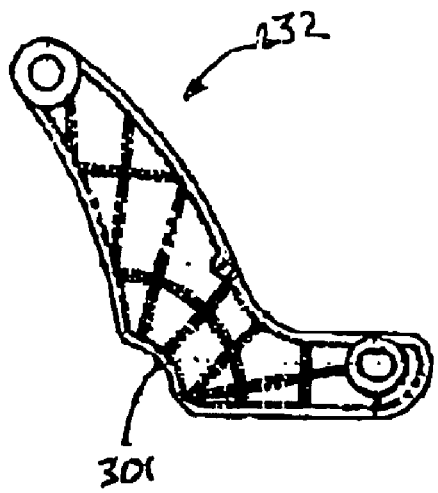
FIGS. 34A and 34B are respectively side and perspective views of a first link member as shown in FIG. 25.
Figure 34B:
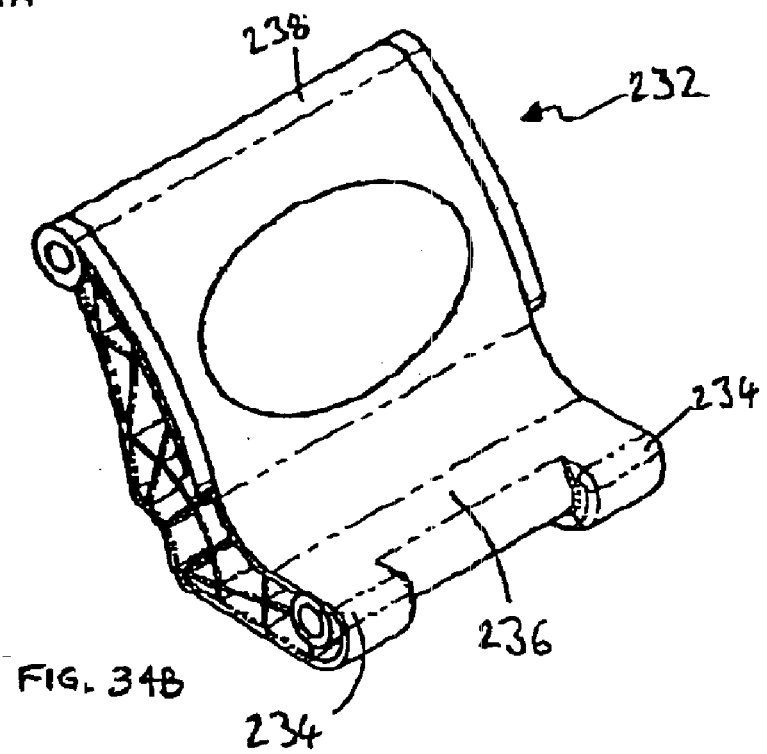

Detailed views of the first link member 232 are shown in FIG. 34A, which is a side view, and FIG. 34B, which is a perspective view.

As described above, the first link member 232 includes a pair of link arms 234 joined by a body 236. It will be appreciated that in some embodiments the two link arms and the body may form a single block with a substantially uniform cross-section, and that the link arms 234 and body 236 may not be distinct or readily distinguishable from each other. It is also possible to have the body portion engage other elements of the mounting assembly as do the link arms, so that in such an embodiment, the link member could be considered as one very wide link arm. Such embodiments are not considered to fall outside the description of two link arms with a body extending therebetween. The important features are that the link member extends a substantial distance laterally and that two (not necessarily distinct) connected portions on opposing lateral sides of the link member each perform the function of a link arm. In the described embodiment, the lateral extent of the link arms is somewhat greater than their other dimensions, although this is not necessary in all embodiments. The first link member 232 of FIGS. 34A and 34B has lateral extent (into the drawing as seen in FIG. 34A) of about 110 mm, a height (vertical dimension as seen in FIG. 34A) of about 90 mm and a length (horizontal dimension as seen in FIG. 34A) of about 105 mm. As previously described, the first link member 232 has a shape which might be described as an open L-shape, that is the shape of a letter "L" but in which the angle between the two straight lines of the "L" is rather larger than 90 degrees. In the embodiment of FIG. 34A, this Ada angle is about 125 degrees. At the outside of the corner thus provided, the first link member includes a concave engagement surface for engaging the second end 248 of the second link member 240 when the mounting assembly 210 is in the working position.

Figure 35A:
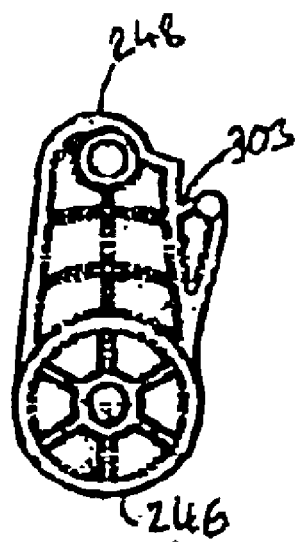
FIGS. 35A and 35B are respectively side and perspective views of a second link member which is a slight variation of that shown in FIG. 25.
Figure 35B:
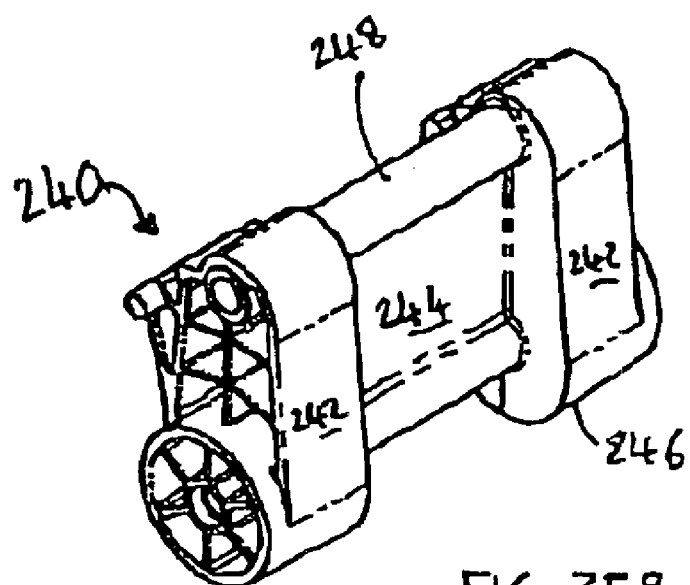

The considerations above relating to the link arms and body portion of the first link member 232 also apply to the second link member 240. The second link member 240 is shown in detail in FIG. 35A, which provides a side elevation and FIG. 35B, which provides a perspective view. As described earlier, the second link member 240 has a first end 246 and a second end 248 and, in this embodiment, includes a distinct pair of link arms 242 with a body portion 244 therebetween. The portions of the link arms 242 at the second end 248 of the second link member 240 form convex engagement portions 302 which, in use, engage with the concave engagement portions 301 of the first link member 232 when the mounting assembly 210 is in its working position. As can be seen in FIG. 35A, in this embodiment the second link member 240 includes on each link arm 242 an additional engagement portion 303 in the form of a groove which, in use, receives and engages a link engagement portion in the form of the rear edge 264A of the bottom portion 264 of the intermediate member 250. When the apparatus is in its working position, the continuous rear edge is securely located in the laterally spaced apart grooves in the two link arms 242 and its vertical movement is restricted by this location, providing resistance to torsional forces. This helps provide a further degree of stability to the mounting assembly 210.

In a preferred embodiment, the mounting assembly is for use with a foldable ironing board, and may include a cover for use when the ironing board is in its storage configuration. FIGS. 36A to 36E illustrate the use of such an ironing board including the cover.

FIG. 36A illustrates the removal of an ironing board cover 310 from a foldable ironing board assembly 320. The ironing board cover 310 is removed from its position on the ironing board assembly 320, where it is retained by engagement of a top edge of the cover 312 on a frame portion 322 of the ironing board assembly 320, which is adapted for the purpose.

As shown in FIG. 36B, the cover 310 can then be engaged on the hook portions 209 of the support member 218 for convenience storage while the ironing board is in use. The cover 310 includes engagement portions 314 to engage the hook portions 209.

As shown in FIG. 36C, once the cover 310 is conveniently stored on the hook portions 209, the ironing board assembly 320 may be moved from its storage position to a working position by operation of the mounting assembly 210, and then operation of a generally central hinge of the ironing board. FIG. 36D shows, from below, the ironing board assembly 320 in its unfolded configuration with the cover 310 shown in its storage position. As shown in FIG. 36E, the ironing board assembly 320 preferably allows the ironing board to rotate in a horizontal plane so that it can be placed in a convenient operating position.

FIG. 37 is a perspective view from above of an ironing board assembly (without fabric cover) in its working position. An iron stand 330 is provided by attachment of ends of the metal frame from which it is formed in the apertures 219 of the support member 218. The stand 330 pivots about these apertures for storage, and is supported in a substantially horizontal, working position by engagement of stop members 331 on the upper edges of the limbs 224 of the support member 218.

It is to be appreciated that the mounting assembly 210 may be used with articles other than folding ironing boards. The provision of an intermediate member 250 to which the first and second link members 232, 240 are pivotally attached allows great flexibility of function, since a box section metal frame may be easily attached thereto, and an appropriate frame may underlie an ironing board, a table, a clothes airier, or one of many other pieces of equipment which might advantageously be moved from a working position to a storage position by use of the mounting assembly 210.

Use of a cover 310 provides an aesthetically pleasing finish when equipment is in its storage position, and the mounting assembly 210 allows a narrow profile. Furthermore, if desired, the mounting member 218 may be easily removed by lifting it away from the mounting plate 212 and the mounting assembly as a whole may be stored in a different location.

Using the mounting plate 212, mounting of the assembly 210 to a wall is easy and convenient since the mounting plate 212 need only be screwed to a single stud of the wall or other support element. Many prior art mounting arrangements require a number of members to be mounted to a support element, or require a cabinet or special mounting frame to be attached to the wall. The provision of short but relatively wide link members provides good resistance to unwanted wobble and twist and enables a single mounting assembly to support a working surface rather than requiring two spaced apart mounting assemblies.

The provision of a support member 218 with limbs 224 effectively houses the link members 232, 240 providing an aesthetic and well supported linkage system.

Although it is envisaged that the mounting assembly 210 will normally be used in the orientation shown in FIG. 29, that is with the first link member 232 positioned generally above the second link member 240 and operating a member to which the link members 232, 240 are attached from a vertical storage position to a horizontal working position, other orientations are possible as will be appreciated from the disclosure of FIGS. 35 to 37.

Although the invention has been described with reference to preferred embodiments it is to be understood that the invention is not limited to the specific embodiments described herein.

What is claimed is:

1. A mounting assembly for mounting a member to a support so that the member is angularly movable from a storage position to a working position, said working position being a predetermined angular displacement in a deployment direction from the storage position, comprising:

a first link which, in use, is pivotally mounted to the support at a first end of said first link at a connection point thereof, and which, in use, is pivotally mounted to said member at a second end of said first link; and a second link which, in use, is pivotally mounted to the support at a first end of the second link, at a point on the support below the connection point of the first link, said second link being, in use, pivotally mounted to said member at a second end of the second link;

wherein the positions where the first and second links are pivotally attached to the member are spaced apart, so that the first and second links move relative to each other as the member is moved between the storage position and the working position;

wherein the first and second links are provided with respective abutment portions, such that the abutment portion of the second link abuts the abutment portion of the first link at the working position of the member, to prevent further relative movement of the first and second links corresponding to the deployment direction and to prevent angular movement of the member past the working position; and wherein in use, at the working position of the member, the second end of the first link and the second and of the second link are both intermediate the first end of the first link and the first end of the second link.

2. A mounting assembly for a member as claimed in claim 1 wherein said first link is pivoted together with a plate at its second end, said plate having an arcuate slot therein concentric with the pivot at the second end of the first link, the second link being pivotally connected at its second end with said plate at a point adjoining the end of said slot, said member being fitted with a pin captured in said slot, so that for a given position of the first and second links the linkage of the member to the first and second links via the pin captured in the slot allows a rotational movement of the member relative to the links, in order to allow a greater angular displacement between the storage position and working position, and in which the degree of movement allowed by the slot is predetermined so as not to allow the member to pass the working position.

3. A wing with an edge about which it pivots, said wing being mounted at respective ends of said edge by a pair of mounting assemblies as claimed in claim 1.

4. A wing as claimed in claim 3 wherein the support to the pair of mountings is mounted on sliding tracks for translation from the working position prior to rotation into the working position.

5. A wing as claimed in claim 4 wherein the wing supports thereon a rotatably mounted planar element.

6. A wing as claimed in claim 4 wherein the planar element is in two segments one hinged to the other for movement from a folded position to a co-planar disposition.

7. An ironing board comprising:

a planar element adapted to provide an ironing surface;

mounting means by which the planar element is able to be moved from a storage position to a working position, said working position being a predetermined angular displacement in a deployment direction from the storage position;

said mounting means comprising a pair of spaced apart pivotal linkages, each said pair having first and second links connected at respective spaced apart first ends to a support and respective spaced apart second ends to the planar element; wherein:

the first and second links are provided with respective abutment portions, such that the abutment portion of the second link abuts the abutment portion of the first link when the ironing surface is in the working position, to prevent further relative movement of the first and second links corresponding to the deployment direction, to prevent angular movement of the ironing surface past the working position; and in use, at the working position of the member, the second end of the first link and the second end of the second link are both intermediate the first end of the first link and the first end of the second link.

8. An ironing board as claimed in claim 7 wherein the stop or limit means is mounted to the first link and engages at the working position with that end of the second link which attaches to the ironing surface, said engagement involving a convex surface nested in a complementary concavity on the respective engaging parts.

9. An ironing board as claimed in claim 7 wherein the storage position is vertically in a wall mounted cabinet, the first and second links extend from the back of the cabinet standing the planar element thereof, the first or second links enabling angular movement to a generally horizontal working disposition projected forwardly of the cabinet.

10. An ironing board as claimed in claim 7 wherein the storage position is in a cabinet where the support is a frame on tracks, able to be drawn from within the cabinet to a position where at the board can be moved angularly to the working position.

11. An ironing board as claimed in claim 10 wherein the ironing surface is stored off the links on support arms permitting the ironing surface to be moved over the frame to a generally vertical storage position at the rear thereof.

12. An ironing board as claimed in claim 7 wherein the storage position is in a drawer unit and the planar element is mounted to the floor thereof via said first and second links and an intermediate pivotal plate pivotally connected with the second end of the first link at the planar element with an arcuate slot therein concentric therewith, said plate being pivotally connected with the second end of the second link and said planar element having a pin thereon engaged in said slot whereby to enable the planar element to lie in a storage position in said drawer unit and be drawn upwardly therefrom to a working position extending outwardly of the drawer unit, wherein the provision of the intermediate pivotal plate allows rotational movement of the planar element relative to the links, for given position of the links, in order to provide an increased angular displacement between the storage position and the working position, and wherein the degree of movement allowed by the slot is predetermined so as not to allow the planar element to pass the working position.

13. An ironing board as claimed in claim 12 wherein the planar element is fitted with a turntable on which is disposed to a two part hinged together board adapted to form the ironing surface being foldable to collapse into said drawer unit when being stored.

* * * * *